(12) United States Patent
Sanghi et al.

(10) Patent No.: US 10,846,224 B2
(45) Date of Patent: Nov. 24, 2020

(54) METHODS AND APPARATUS FOR CONTROL OF A JOINTLY SHARED MEMORY-MAPPED REGION

(71) Applicant: Apple Inc., Cupertino, CA (US)

(72) Inventors: Karan Sanghi, San Jose, CA (US); Saurabh Garg, San Jose, CA (US); Jason McElrath, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 16/112,480

(22) Filed: Aug. 24, 2018

(65) Prior Publication Data

US 2020/0065244 A1 Feb. 27, 2020

(51) Int. Cl.
*G06F 12/084* (2016.01)
*G06F 13/16* (2006.01)

(52) U.S. Cl.
CPC ........ *G06F 12/084* (2013.01); *G06F 13/1668* (2013.01); *G06F 2212/1044* (2013.01)

(58) Field of Classification Search
CPC .................................................. G06F 12/084
See application file for complete search history.

(56) References Cited

U.S. PATENT DOCUMENTS

| | | | |
|---|---|---|---|
| 4,805,137 A | 2/1989 | Grant et al. | |
| 4,949,299 A | 8/1990 | Pickett et al. | |
| 5,467,459 A | 11/1995 | Alexander et al. | |
| 5,485,578 A | 1/1996 | Sweazey | |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A | 3/1998 | Takaishi et al. | |

(Continued)

FOREIGN PATENT DOCUMENTS

EP 3013008 A1 4/2016
JP H02306082 A 12/1990

(Continued)

OTHER PUBLICATIONS

Co-pending U.S. Appl. No. 15/865,638, filed Jan. 9, 2018.

(Continued)

*Primary Examiner* — Edward J Dudek, Jr.
(74) *Attorney, Agent, or Firm* — Gazdzinski & Associates, PC

(57) ABSTRACT

Methods and apparatus for using and controlling a jointly shared memory-mapped region between multiple processors in a pass-through manner. Existing data pipe input/output (I/O) techniques for mobile device operation enable high speed data transfers, decoupled independent operation of processors, reduced software complexity, reduced power consumption, etc. However, legacy functions and capabilities may only receive marginal benefits from data pipe I/O operation, and in some cases, may even suffer adverse effects from e.g., processing overhead and/or context switching. The present disclosure is directed to dynamically isolating and reaping back a jointly shared memory space for data transfer in a "pass through" manner which does not require kernel space intervention. More directly, a jointly shared region of host memory is accessible to both the peripheral client and the host client in user space.

20 Claims, 10 Drawing Sheets

(56) References Cited

U.S. PATENT DOCUMENTS

| | | | |
|---|---|---|---|
| 5,850,395 A | 12/1998 | Hauser et al. | |
| 5,903,564 A | 5/1999 | Ganmukhi et al. | |
| 5,943,507 A | 8/1999 | Cornish et al. | |
| 6,008,992 A | 12/1999 | Kawakami | |
| 6,032,179 A | 2/2000 | Osborne | |
| 6,216,178 B1 | 4/2001 | Stracovsky et al. | |
| 6,233,702 B1 | 5/2001 | Horst et al. | |
| 6,260,152 B1 | 7/2001 | Cole et al. | |
| 6,359,863 B1 | 3/2002 | Varma et al. | |
| 6,411,997 B1 | 6/2002 | Dawes et al. | |
| 6,485,081 B1 | 11/2002 | Bingle et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,815,873 B2 | 11/2004 | Johnson et al. | |
| 6,840,257 B2 | 1/2005 | Dario et al. | |
| 6,843,465 B1 | 1/2005 | Scott | |
| 6,948,094 B2 | 9/2005 | Schultz et al. | |
| 6,973,701 B2 | 12/2005 | Momoda et al. | |
| 6,990,594 B2 | 1/2006 | Kim et al. | |
| 7,013,536 B2 | 3/2006 | Golden et al. | |
| 7,032,282 B2 | 4/2006 | Powell et al. | |
| 7,055,793 B2 | 6/2006 | Biehl et al. | |
| 7,100,020 B1 | 8/2006 | Brightman et al. | |
| 7,127,600 B2 | 10/2006 | Zimmer et al. | |
| 7,152,231 B1 | 12/2006 | Galluscio et al. | |
| 7,281,172 B2 | 10/2007 | Chujo | |
| 7,347,221 B2 | 3/2008 | Berger et al. | |
| 7,397,774 B1 | 7/2008 | Holland et al. | |
| 7,398,382 B2 | 7/2008 | Rothman et al. | |
| 7,403,542 B1 | 7/2008 | Thompson | |
| 7,509,391 B1 | 3/2009 | Chauvel et al. | |
| 7,650,914 B2 | 1/2010 | Bogursky et al. | |
| 7,681,012 B2 | 3/2010 | Verm et al. | |
| 7,685,476 B2 | 3/2010 | Andre et al. | |
| 7,802,256 B2 | 9/2010 | Havens et al. | |
| 7,853,731 B1 | 12/2010 | Zeng | |
| 7,899,941 B2 | 3/2011 | Hendry et al. | |
| 7,926,520 B2 | 4/2011 | Bogursky et al. | |
| 7,941,682 B2 | 5/2011 | Adams | |
| 8,113,243 B2 | 2/2012 | Bogursky et al. | |
| 8,214,707 B2 | 7/2012 | Munson et al. | |
| 8,255,725 B2 | 8/2012 | Shimazaki et al. | |
| 8,352,624 B2 | 1/2013 | Zimmerman et al. | |
| 8,468,285 B2 | 6/2013 | Kobayashi | |
| 8,540,206 B2 | 9/2013 | Foshansky et al. | |
| 8,635,412 B1 | 1/2014 | Wilshire | |
| 8,656,228 B2 | 2/2014 | Check et al. | |
| 8,788,822 B1 | 7/2014 | Riddle | |
| 8,799,537 B1 | 8/2014 | Zhu et al. | |
| 8,819,386 B1 | 8/2014 | Mather | |
| 8,848,809 B2 | 9/2014 | Whitby-Strevens | |
| 8,851,443 B2 | 10/2014 | Foshansky | |
| 8,876,062 B1 | 11/2014 | Baghdasarian | |
| 8,939,180 B2 | 1/2015 | Bogursky et al. | |
| 8,946,934 B2 | 2/2015 | Butts et al. | |
| 9,027,903 B2 | 5/2015 | Arekar et al. | |
| 9,049,179 B2 | 6/2015 | Luna | |
| 9,152,580 B1 | 10/2015 | Chau et al. | |
| 9,170,957 B2 | 10/2015 | Touzni et al. | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,932,757 B2 | 4/2018 | Hager et al. | |
| 10,289,555 B1 | 5/2019 | Michaud | |
| 10,331,600 B1 | 6/2019 | Rajadnya et al. | |
| 10,534,601 B1 | 1/2020 | Venkata et al. | |
| 2001/0037410 A1* | 11/2001 | Gardner | G06F 9/54 719/313 |
| 2002/0013868 A1 | 1/2002 | West | |
| 2002/0044553 A1 | 4/2002 | Chakravorty | |
| 2002/0053011 A1 | 5/2002 | Aiken et al. | |
| 2002/0065867 A1 | 5/2002 | Chauvel | |
| 2002/0169938 A1 | 11/2002 | Scott et al. | |
| 2002/0195177 A1 | 12/2002 | Hinkley et al. | |
| 2003/0014607 A1 | 1/2003 | Slavin et al. | |
| 2003/0061395 A1* | 3/2003 | Kingsbury | G06F 9/544 719/312 |
| 2003/0200413 A1 | 10/2003 | Gurumoorthy et al. | |
| 2004/0010473 A1 | 1/2004 | Hsu | |
| 2004/0044929 A1 | 3/2004 | Chujo | |
| 2004/0128568 A1 | 7/2004 | O'Shea | |
| 2004/0179546 A1 | 9/2004 | McDaniel et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0005980 A1 | 1/2005 | Eberhardt et al. | |
| 2005/0076196 A1 | 4/2005 | Zimmer et al. | |
| 2005/0076244 A1 | 4/2005 | Watanabe | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0138628 A1 | 6/2005 | Bradford et al. | |
| 2005/0149711 A1 | 7/2005 | Zimmer et al. | |
| 2005/0157781 A1 | 7/2005 | Ho et al. | |
| 2005/0198777 A1 | 9/2005 | Mabe | |
| 2005/0278498 A1 | 12/2005 | Ahluwalia | |
| 2005/0285862 A1 | 12/2005 | Noda et al. | |
| 2006/0039285 A1 | 2/2006 | Chapman et al. | |
| 2006/0047989 A1 | 3/2006 | Delgado et al. | |
| 2006/0107071 A1 | 5/2006 | Girish et al. | |
| 2006/0186700 A1 | 8/2006 | Browne et al. | |
| 2006/0186706 A1 | 8/2006 | Browne et al. | |
| 2006/0218301 A1 | 9/2006 | O'Toole et al. | |
| 2006/0232051 A1 | 10/2006 | Morris et al. | |
| 2007/0005869 A1 | 1/2007 | Balraj et al. | |
| 2007/0043901 A1 | 2/2007 | Wu et al. | |
| 2007/0063540 A1 | 3/2007 | Browne et al. | |
| 2007/0063541 A1 | 3/2007 | Browne et al. | |
| 2007/0070997 A1 | 3/2007 | Weitz et al. | |
| 2007/0080013 A1 | 4/2007 | Melz et al. | |
| 2007/0118831 A1 | 5/2007 | Kondo | |
| 2007/0180041 A1 | 8/2007 | Suzuoki | |
| 2007/0183418 A1 | 8/2007 | Riddoch | |
| 2007/0201492 A1 | 8/2007 | Kobayashi | |
| 2007/0226375 A1 | 9/2007 | Chu et al. | |
| 2007/0226417 A1 | 9/2007 | Davis | |
| 2007/0261307 A1 | 11/2007 | Alexander et al. | |
| 2007/0286246 A1 | 12/2007 | Kobayashi et al. | |
| 2008/0005794 A1* | 1/2008 | Inoue | G06F 21/56 726/22 |
| 2008/0007081 A1 | 1/2008 | Shibata et al. | |
| 2008/0010563 A1 | 1/2008 | Nishimura | |
| 2008/0046689 A1 | 2/2008 | Chen et al. | |
| 2008/0077816 A1 | 3/2008 | Ravichandran | |
| 2008/0100079 A1 | 5/2008 | Herrera et al. | |
| 2008/0100092 A1 | 5/2008 | Gao et al. | |
| 2008/0120911 A1 | 5/2008 | Browne et al. | |
| 2008/0127292 A1 | 5/2008 | Cooper et al. | |
| 2008/0148291 A1* | 6/2008 | Huang | G06F 9/545 719/320 |
| 2008/0183931 A1 | 7/2008 | Verm et al. | |
| 2008/0231711 A1 | 9/2008 | Glen et al. | |
| 2008/0235355 A1 | 9/2008 | Spanier et al. | |
| 2008/0244259 A1 | 10/2008 | Zimmer et al. | |
| 2008/0301148 A1 | 12/2008 | Lee et al. | |
| 2009/0024924 A1 | 1/2009 | Kim | |
| 2009/0113141 A1 | 4/2009 | Bullman et al. | |
| 2009/0138650 A1 | 5/2009 | Lin et al. | |
| 2009/0172674 A1 | 7/2009 | Bobak et al. | |
| 2009/0177847 A1 | 7/2009 | Ceze et al. | |
| 2009/0189442 A1 | 7/2009 | Chi | |
| 2009/0225818 A1 | 9/2009 | Dapper et al. | |
| 2009/0240874 A1 | 9/2009 | Pong | |
| 2009/0265723 A1 | 10/2009 | Mochizuki | |
| 2009/0322531 A1 | 12/2009 | Estevez et al. | |
| 2010/0005014 A1 | 1/2010 | Castle et al. | |
| 2010/0017655 A1 | 1/2010 | Gooding et al. | |
| 2010/0082859 A1 | 4/2010 | Hendry et al. | |
| 2010/0098419 A1 | 4/2010 | Levy et al. | |

(56) References Cited

U.S. PATENT DOCUMENTS

| | | |
|---|---|---|
| 2010/0118041 A1* | 5/2010 | Chen .................. G06F 12/1081 345/542 |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0151913 A1 | 6/2012 | Foshansky |
| 2012/0203880 A1 | 8/2012 | Kluyt et al. |
| 2012/0224640 A1 | 9/2012 | Sole et al. |
| 2012/0229076 A1 | 9/2012 | Zhu et al. |
| 2012/0260017 A1* | 10/2012 | Mine ...................... G06F 9/544 710/308 |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111896 A1 | 5/2013 | Foshansky et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0068624 A1 | 3/2014 | Fuller et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0247983 A1 | 9/2014 | Macinnis et al. |
| 2015/0007262 A1 | 1/2015 | Aissi et al. |
| 2015/0036051 A1 | 2/2015 | Broberg et al. |
| 2015/0081985 A1* | 3/2015 | Archer .................. G06F 3/0613 711/147 |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0261588 A1* | 9/2015 | Liu ...................... G06F 9/54 719/314 |
| 2015/0267690 A1 | 9/2015 | Foshansky et al. |
| 2015/0309940 A1 | 10/2015 | Kumar et al. |
| 2015/0363110 A1* | 12/2015 | Batra .................. G06F 3/0604 711/147 |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0044143 A1 | 2/2016 | Narasimhamurthy |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226967 A1 | 8/2016 | Zhang et al. |
| 2016/0231929 A1 | 8/2016 | Tsirkin |
| 2016/0261632 A1 | 9/2016 | Kolhi et al. |
| 2016/0269991 A1 | 9/2016 | Van et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2017/0003977 A1 | 1/2017 | Sumida |
| 2017/0003997 A1 | 1/2017 | Kelly et al. |
| 2017/0075856 A1* | 3/2017 | Suzue .................. H04L 67/1097 |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0147282 A1* | 5/2017 | Seo ...................... G10L 19/16 |
| 2017/0249098 A1 | 8/2017 | Petkov et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0371591 A1* | 12/2017 | Xia ...................... G06F 3/0604 |
| 2018/0004690 A1* | 1/2018 | Kaminski ............ G06F 13/1663 |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0219976 A1 | 8/2018 | Decenzo et al. |
| 2018/0295052 A1 | 10/2018 | St-Laurent |
| 2019/0036893 A1 | 1/2019 | Jiang |
| 2019/0213044 A1 | 7/2019 | Cui et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

ECN L1 PM Substates with CLKREQ approved Aug. 23, 2012.

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

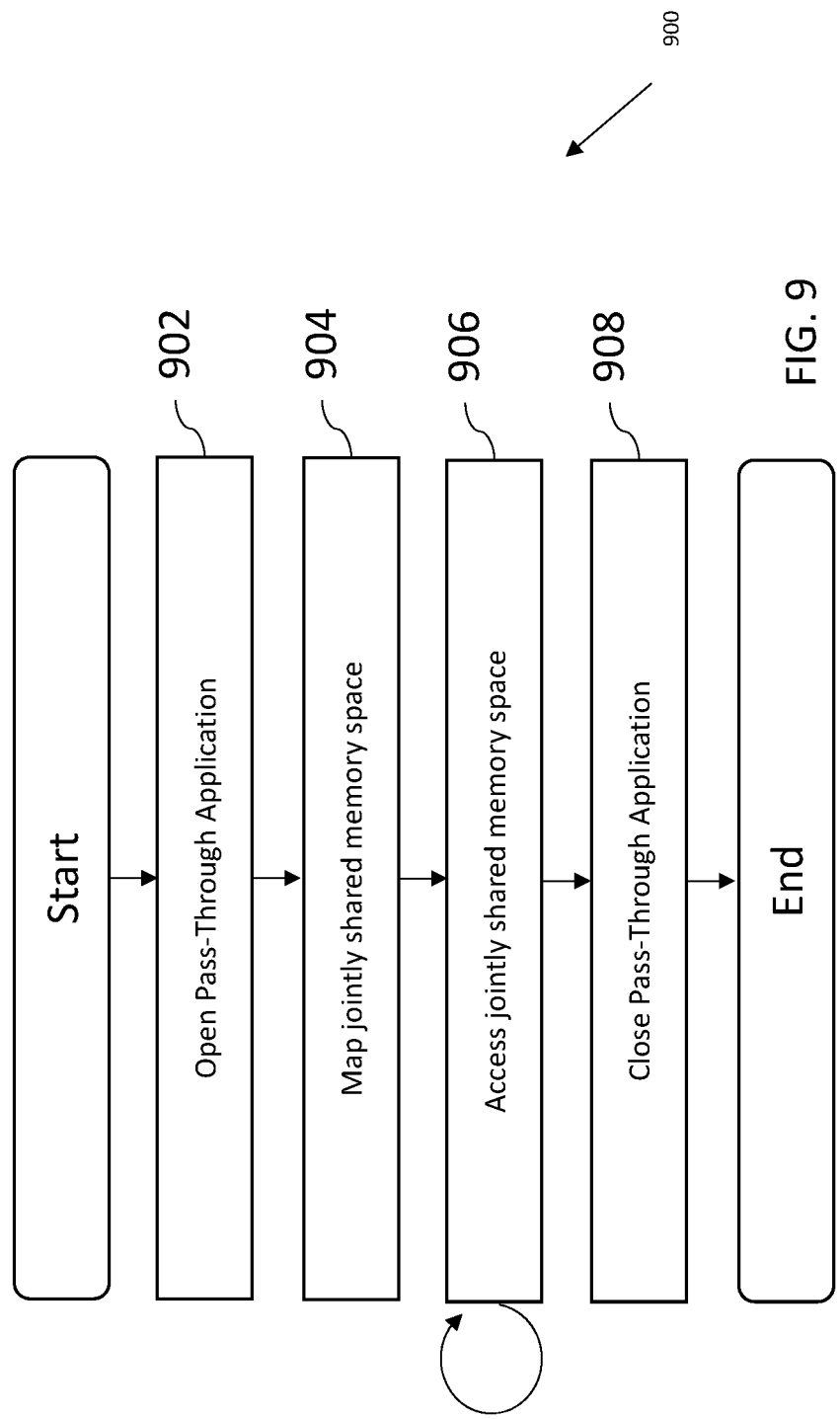

METHODS AND APPARATUS FOR CONTROL OF A JOINTLY SHARED MEMORY-MAPPED REGION

RELATED APPLICATIONS

This application is related to commonly owned U.S. patent application Ser. No. 15/840,473 entitled "METHODS AND APPARATUS FOR SCHEDULING TIME SENSITIVE OPERATIONS AMONG INDEPENDENT PROCESSORS" and filed Dec. 13, 2017; Ser. No. 15/720,603 entitled "METHODS AND APPARATUS FOR TRANSMITTING TIME SENSITIVE DATA OVER A TUNNELED BUS INTERFACE" and filed Sep. 29, 2017; Ser. No. 16/049,624 entitled "METHODS AND APPARATUS FOR VERIFYING COMPLETION OF GROUPS OF DATA TRANSACTIONS BETWEEN PROCESSORS" and filed Jul. 30, 2018; Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; and Ser. No. 14/856,283 entitled "METHODS AND APPARATUS FOR AGGREGATING PACKET TRANSFER OVER A VIRTUAL BUS INTERFACE" and filed Sep. 16, 2015; each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, and in one exemplary aspect, the disclosure is directed to methods and apparatus for using and controlling a jointly shared memory-mapped region between multiple processors. In various exemplary aspects, the present disclosure is directed to dynamically isolating and reaping back a memory space for data transfer in a "pass through" manner which does not require kernel space intervention.

2. Description of Related Technology

Consumer devices and computer systems have grown more sophisticated over time, and has led to architectures that incorporate multiple processing components (e.g., processors). Each of these multiple processors play a distinct role in accomplishing one or more functions of e.g., a consumer device (e.g., smartphone, tablet, laptop, phablet, smartwatch, portable media players, smart home device, intelligent personal assistant).

Various bus architectures and techniques have evolved over time which are able to handle increasingly faster data rates and provide higher levels of data throughput appropriate for recent implementations. Incipient research is directed to bus technologies for use in multi-processor architectures for mobile devices. For example, one implementation of an inter-processor communication (IPC) link is derived from Peripheral Component Interconnect Express (PCIe) technology. PCIe was originally designed for desktop and/or server applications. However, unlike desktop computing applications, mobile devices are significantly constrained in terms of power consumption, processing power, memory capacity, and any number of other mobility related constraints.

The successful implementation of PCIe-based connectivity over a myriad of different applications has been enabled by, inter alia, the principles of modular design and abstraction. Specifically, the traditional PCIe communication paradigm separates user space applications from a kernel space communication stack. Each entity separately manages its own implementation specific considerations; thus enabling an "abstracted" communication for a variety of different application requirements. In this manner, different applications can communicate freely without considering the underlying transport constraints (e.g., bandwidth, congestion, arbitration, etc.).

Existing implementations of IPC have inherited this same paradigm. IPC allows any number of software applications to open so-called "data pipes" for communication. The user space applications can send and receive data by reading and writing to a data pipe. The kernel space communication stack manages the underlying data transfer. Existing IPC offers a plethora of advantages that are tailored for mobile device operation including e.g., high speed data transfers, decoupled independent operation of processors, reduced software complexity, reduced power consumption, and the like.

However, not all types of data transfers may need the capabilities of, or be improved, by IPC operation. For example, legacy functions and capabilities may only receive marginal benefits from IPC operation, and in some cases, may even suffer adverse effects from e.g., processing overhead and/or context switching. Similarly, highly optimized data transfer techniques may be unsuitable for IPC operation and/or designed for memory-mapped technologies and paradigms. For example, many different bus technologies have been developed for digital audio/visual (A/V) data transfer that rely on DMA (direct memory access) type access. More generally, certain peripheral applications may be better suited to memory-mapped I/O in the user space.

To these ends, solutions for "pass through" data communications that do not require the formalities of inter-processor communication (IPC) are needed. More generally, improved methods and apparatus are needed for using and controlling a jointly shared memory-mapped region between multiple processors.

SUMMARY

The present disclosure satisfies the foregoing needs by providing, inter alia, methods and apparatus for using and controlling a jointly shared memory-mapped region between multiple processors.

In one aspect, a method for using a jointly shared memory between a first and a second processor is disclosed. In one embodiment, the method includes: opening a pass-through application; mapping a jointly shared memory space for the pass-through application; accessing the jointly shared memory space via the pass-through application; and closing the pass-through application.

In one variant, the pass-through application is a user space application. In another variant, accessing the jointly shared memory space includes writing data to the jointly shared memory space and causing a peer application to read the written data from the jointly shared memory space. In another such variant, mapping the jointly shared memory space for the pass-through application includes assigning a physical address location within a memory device to a virtual address for a memory-mapped input/output (I/O). In another such variant, the user space application can read and write to a physical address location of the jointly shared memory space without context switching to a kernel space communication stack.

In another such variant, accessing the jointly shared memory space includes queueing a plurality of accesses of the jointly shared memory space. In one such implementation, responsive to closing the pass-through application the method flushes any outstanding accesses of the plurality of queued accesses.

In another such variant, accessing the jointly shared memory space includes writing an entry within a ring buffer.

In another such variant, changing at least one parameter of the jointly shared memory space is based on a non-coordinated message.

In another aspect, an apparatus is disclosed. In one embodiment, the apparatus includes a host processor coupled to a peripheral processor; and a non-transitory computer readable medium including one or more instructions. In one exemplary embodiment, the instructions when executed cause the host processor to: manage one or more data pipe transactions via a kernel space communication stack within a shared memory; map a jointly shared memory space within the shared memory, the jointly shared memory space accessible via a memory-mapped input/output (I/O) in user space; and access the jointly shared memory space via a pass-through application.

In one variant, the host processor includes an application processor and the pass-through application includes a streaming audio application.

In another variant, the one or more data pipe transactions are managed via a transfer ring (TR) of an inter-processor communication (IPC) driver. In another such variant, the jointly shared memory space within the shared memory is reserved from a memory space associated with the IPC driver. In another such variant, the jointly shared memory space within the shared memory is allocated from unallocated memory.

In a second embodiment, the apparatus includes: a peripheral processor coupled to a host processor; and a non-transitory computer readable medium including one or more instructions. The instructions when executed by the peripheral processor, cause the peripheral processor to: receive a memory map message identifying a jointly shared memory space within a shared memory; access the jointly shared memory space via a pass-through application; and transmit a non-coordinated control message to signal an event associated with the jointly shared memory space.

In one variant, the peripheral processor includes a media processor and the pass-through application includes a streaming audio application that uses a memory-mapped input/output (I/O) to access the jointly shared memory space.

In another variant, the non-coordinated control message includes a completion descriptor (CD) that does not correspond to a transfer descriptor (TD).

In yet another variant, the jointly shared memory space includes a circular buffer within user space. In yet another variant, the non-coordinated control message is transmitted via a kernel space communication stack. In yet another variant, the event associated with the jointly shared memory space includes a wrap of the circular buffer.

In yet another aspect, a processor configured to use a jointly shared memory space is disclosed. In one exemplary embodiment, the processor is coupled to non-transitory computer-readable medium that include one or more instructions which when executed by the processor, cause the processor to transact data via the jointly shared memory space.

In yet another aspect, a processor configured to control a jointly shared memory space is disclosed. In one exemplary embodiment, the processor is coupled to non-transitory computer-readable medium that include one or more instructions which when executed by the processor, cause the processor to control one or more parameters of the jointly shared memory space.

In yet another aspect, a system for enabling multiple processors to jointly share a memory for user space data transfers is disclosed. In one exemplary embodiment, the system includes a consumer electronics apparatus. In one such variant the consumer electronics device is selected from the group including: smartphone, tablet, laptop, phablet, smartwatch, portable media player, smart home device, intelligent personal assistant.

In yet another aspect, a non-transitory computer readable medium configured to enable multiple processors to jointly share a memory for user space data transfers is disclosed. In one exemplary embodiment, the non-transitory computer readable medium includes one or more instructions that are configured to, when executed by a processor: open a pass-through application; map a jointly shared memory space for the pass-through application; access the jointly shared memory space via the pass-through application; and close the pass-through application.

Various other methods and/or apparatus are configured to optimize memory management of a jointly shared data structure, based on memory usage and/or application requirements are disclosed herein. In some embodiments, methods and/or apparatus configured to optimize for different data transfers are disclosed.

Various other methods and/or apparatus are configured to manage multiple ongoing data transfers via individual completion data structures are disclosed herein. In some embodiments, methods and/or apparatus configured to use completion descriptors to moderate the flow of data transfer are described.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 9 is a logical flow diagram of one generalized method for using and controlling a jointly shared memory-mapped region between multiple processors, in accordance with various aspects of the present disclosure.

Figure 1:
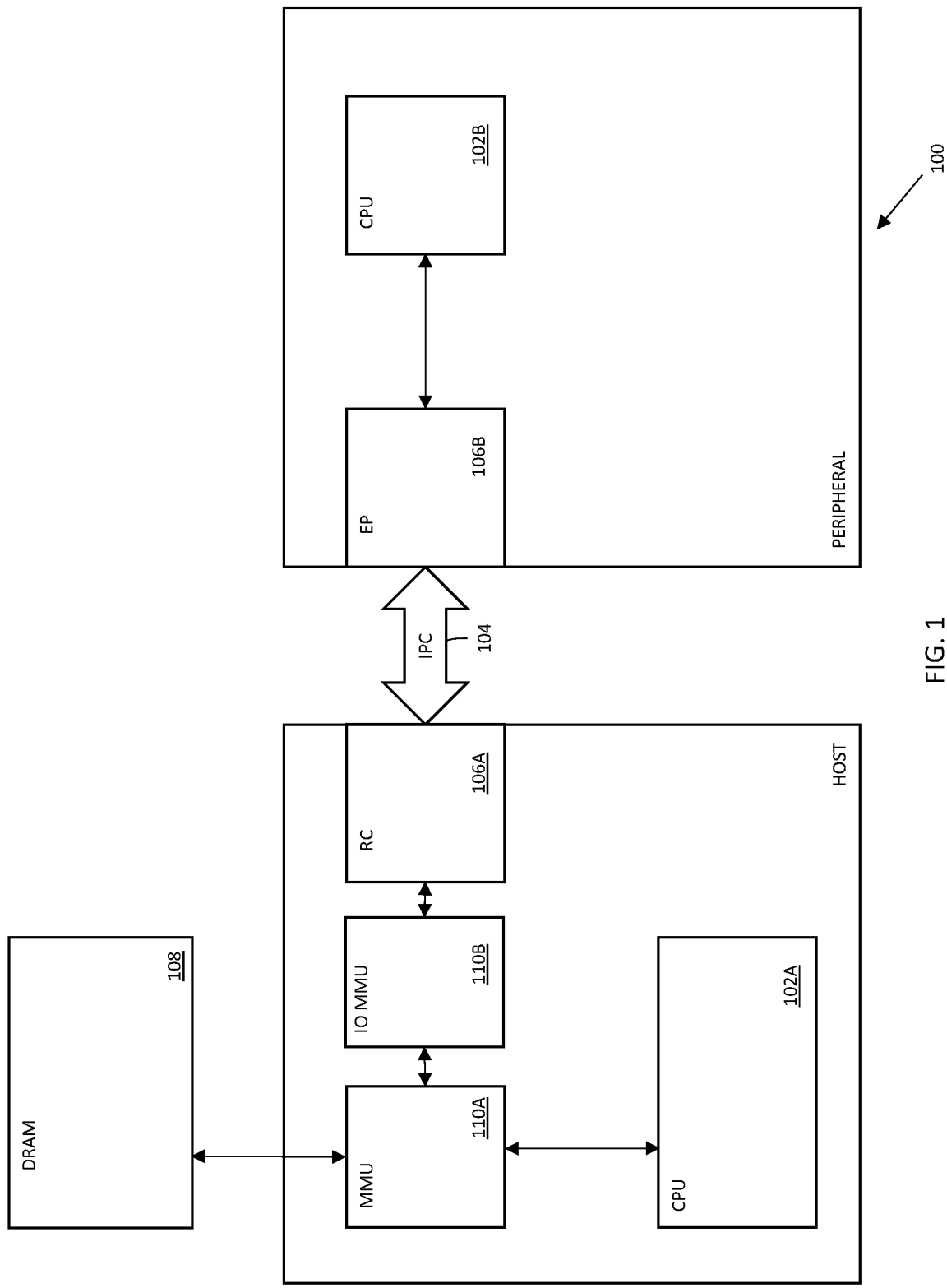
FIG. 1 is a logical block diagram of one exemplary apparatus, useful for explaining various principles described herein.

All figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated herein by reference in its entirety), it will be recognized by those of ordinary skill that the present disclosure is not so limited. In fact, the various aspects of the disclosure are useful in any device or network of devices that is configured to transact a variety of different data types via a jointly shared memory interface, as is disclosed herein.

Exemplary Apparatus

As previously noted, bus techniques have evolved which are able to handle faster data rates and provide higher levels of data throughput. One such example bus technology is referred to as a so-called Peripheral Component Interconnect Express (PCIe) bus. PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) or host processor, and an "endpoint" (EP) or peripheral processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors. Further, the various principles described herein may apply to transactions from a host processor to a peripheral processor and vice versa.

As used herein, the term "independently operable processor" refers to a processing system having one or more of the processor clock domain, processor power domain, processor code base, arithmetic units, registers, and/or memory, capable of being isolated to allow the processor to operate without other processors in the processing system. In one embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

As used herein, a "processor" refers generally to any logic or circuitry that responds to and processes computer-readable instructions or firmware that are stored within, for example, a non-transitory computer-readable medium, e.g., a memory. A processor may be embodied in hardware (e.g., an integrated circuit (IC)) that performs logical operations according to the instructions. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

As used herein, an "application processor" is a processor that is configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth (IEEE Std. 802.15.1) or IEEE Std. 802.15.4, "ZigBee", Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks.)

In one embodiment, the IPC bus is managed by a kernel space communication stack that is called and services multiple user space applications. As a brief aside, user space is a portion of system memory that a processor executes user processes from. User space is freely and dynamically allocated for application software opened by (or on behalf) of the user. The kernel space is a portion of memory that a processor executes the kernel from. Kernel space is strictly reserved (usually during the processor boot sequence) for running privileged operating system (OS) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" or "kernel" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

The term "privilege" refers to any access restriction or permission which restricts or permits processor execution. System privileges are commonly used within the computing arts to mitigate the potential damage of a computer security vulnerability. For instance, a properly privileged computer system will prevent malicious software applications from affecting data and task execution associated with other applications and the kernel.

As used herein, the term "in-kernel" and/or "kernel space" refers to data and/or processes that are stored in and/or have privilege to access to the kernel space memory allocations. In contrast, the terms "non-kernel" and/or "user space" refers to data and/or processes that are not privileged to access the kernel space memory allocations. As a further clarification, user space represents the address space specific to the user process, whereas non-kernel space represents address space which is not in-kernel, but which may or may not be specific to user processes.

As used herein, the term "logical" is used to refer to, without limitation, an abstraction (typically performed in software or machine logic) to represent physical mechanisms, attributes or functionalities as a data structure. For example, as used herein a "logical bus interface," etc., refers generally to an abstraction or representation of a bus interface as a series of data structures. In contrast, a "physical bus interface" as used herein refers to the physical mechanisms, attributes or functionalities of a physically tangible bus interface.

FIG. 1 illustrates apparatus 100 useful for illustrating various principles described herein. As shown, the apparatus 100 includes first and second independently operable processors 102A, 102B, and a physical bus interface 104 that is configured to implement an inter-processor communication (IPC) link between the two (or more) independently operable processors.

The first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (e.g., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor. As shown in FIG. 1, the first processor 102A is coupled to a root complex (RC) 106A which functions as the host of the IPC bus.

In one implementation, the second processor 102B includes a wireless modem. In various embodiments, the second processor 102B includes a Wi-Fi modem, cellular modem, mobile broadband modem, Bluetooth modem, NFC modem, and/or RFID reader, and/or other short-range and long-range protocols so as to include a wireless communication chipset. Other examples of wireless modems include, without limitation devices implementing e.g., IEEE Std. 802.11 (any variants thereof, including Wi-Fi and wireless local area network (WLAN)), PAN technology such as e.g., Bluetooth or IEEE Std. 802.15.4, "ZigBee", NFC or RFID, WiMAX (IEEE 802.16), WMANs, 3G cellular (e.g., Long Term Evolution/Advanced (LTE and LTE-A), WCDMA, 3GPP, 3GPP2, and GSM and improvements thereon), and ISM band devices.

In other embodiments, the second processor 102B may be, e.g., a media processor or other network processing element.

As shown in FIG. 1, the second processor 102B is coupled to an endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power. The non-transitory computer readable medium is configured to store computer readable instructions for execution. Such computer-readable instructions may alternatively or additionally be stored on a local cache associated with at least one of the processors.

As used herein, the term "buffer" refers to a device, circuit, logic, or an area of a computing environment that is used to store data temporarily. Typically, buffered data is stored until instructions are given or received to move the stored data to another entity (e.g., processor, memory, another buffer), or "flush" (empty) the buffer. The term "buffer" may be interchangeable with similar terms such as "cache," "queue," "shared memory," or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, high response ratio, dynamic array. In another embodiment, a buffer may refer to a data structure or memory allocation, e.g., data represented by a so-called transfer descriptor (TD), completion descriptor (CD), transfer descriptor ring (TR), completion descriptor ring (CR), or any other such scheme for storing and/or organizing data. Persons of ordinary skill in the relevant art will recognize various other structures and operations related to buffering and temporary data storage.

Both the first and the second processors (102A, 102B) are each coupled to a non-transitory computer readable medium (e.g., dynamic random access memory (DRAM) 108) and one or more memory management units (MMUs). A MMU translates virtual memory addresses (which are allocated within a processor's memory map) to physical addresses in the DRAM 108. In one such implementation, the MMU is further subdivided into a MMU 110A and an Input Output MMU (IO MMU) 110B thereby allowing for the host and peripheral to have distinct memory maps (e.g., a virtual memory-mapped I/O addresses for the host and virtual memory-mapped I/O addresses for the peripheral). While the foregoing split MMU configuration is illustrated, a single MMU (e.g., a shared memory map) or more MMUs (three, four, etc. memory maps) may be substituted with equivalent success given the contents of the present disclosure.

During normal operation, data transactions are generated by the host processor 102A and/or peripheral processor 102B in the form of data pipes. The corresponding MMU 110A (or IO MMU 110B) manage memory accesses according to the data pipes so as to ensure that e.g., the peripheral does not overwrite, monopolize, or otherwise inadvertently interfere with the host's memory allocation, and vice versa. More directly, the MMU 110A and IO MMU 110B provide a degree of isolation (in the form of data pipes and virtual memory maps) from the physical memory (e.g., the DRAM). The isolation between processors ensures that each processor can operate without coordinating accesses with the other, resulting in higher overall system performance.

Figure 1A:
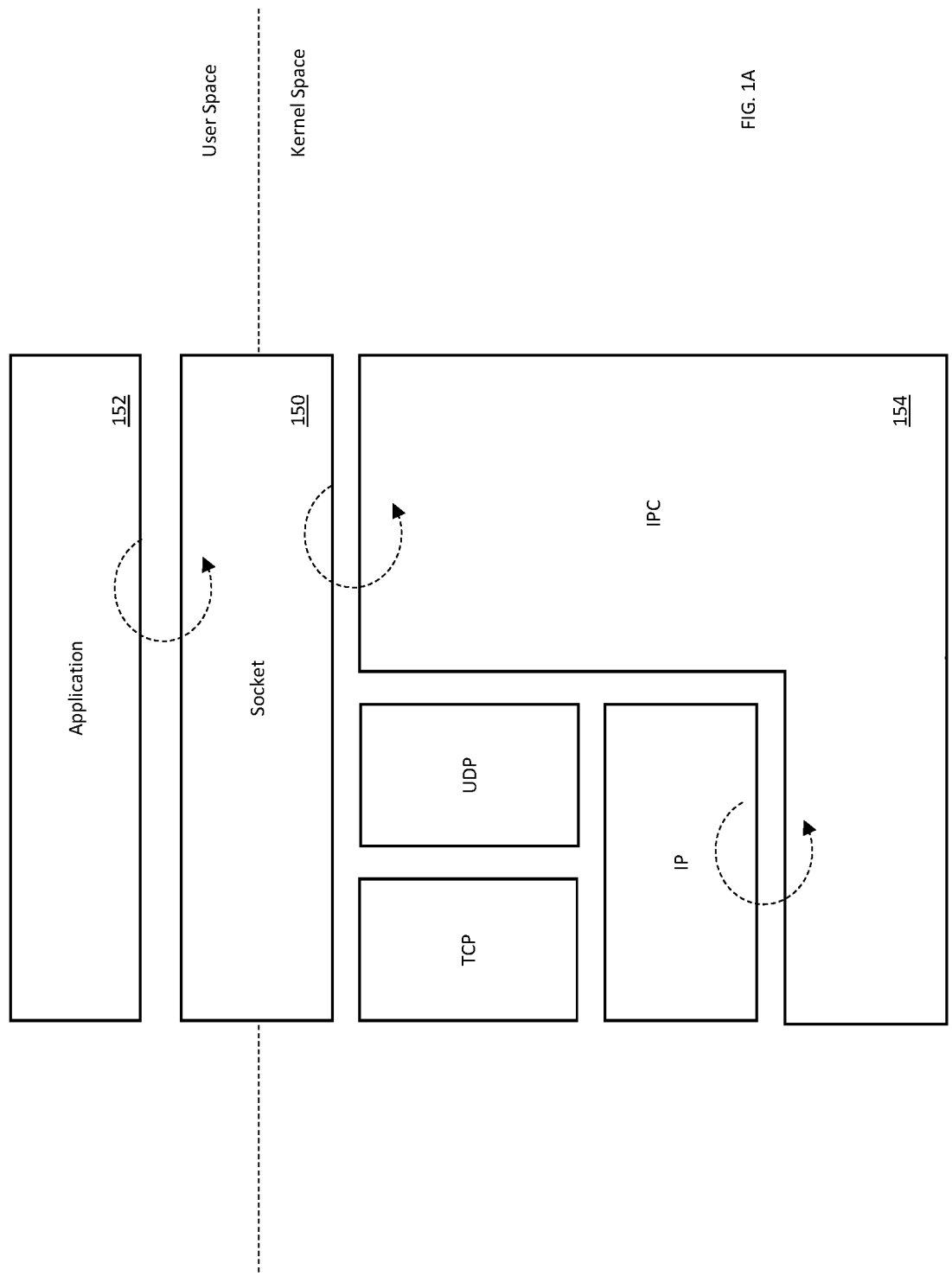
FIG. 1A is a logical block diagram of a socket, useful for explaining various principles described herein.

FIG. 1A illustrates one logical representation of a socket 150, useful for explaining various aspects of the input/output (I/O) interface of the processors 102A and 102B. A "socket" is a virtualized internal endpoint for sending or receiving data at a single node. A socket can be created ("opened") or destroyed ("closed") and the manifest of sockets are stored as entries in a network resource table (which may include many different communication protocols (TCP, UDP, IPC, etc.), destination, status, and any other operational processes (kernel extensions) and/or parameters); more generally, sockets are a form of system resource.

As shown in FIG. 1A, the socket 150 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

Each processor can independently create, modify, and/or destroy data pipes by issuing commands via the socket API. For example, "opening" a pipe in a user space application triggers a context switch to the kernel space communication stack. The kernel space communication stack calls an IPC resource (which is another context switch). The IPC resource creates the "backing" memory allocation for the user space pipe (e.g., in the common DRAM). Thereafter, the pipe identifier is returned to the user space application. Data written by one processor can be retrieved by the other processor (from its backing DRAM allocation) and vice versa via the pipe identifier.

Context switches are commonly used in the processing arts to switch between multiple concurrent tasks. For example, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process or of a thread, so that it can be restored and execution resumed from the same point later. This allows multiple processes to share a single processor. However, excessive amounts of context switching can slow processor performance down. Notably, while the present discussion is discussed within the context of a single processor, multi-processor systems have analogous concepts (e.g., multiple processors also perform context switching, although contexts may not necessarily be resumed by the same processor).

Figure 2:
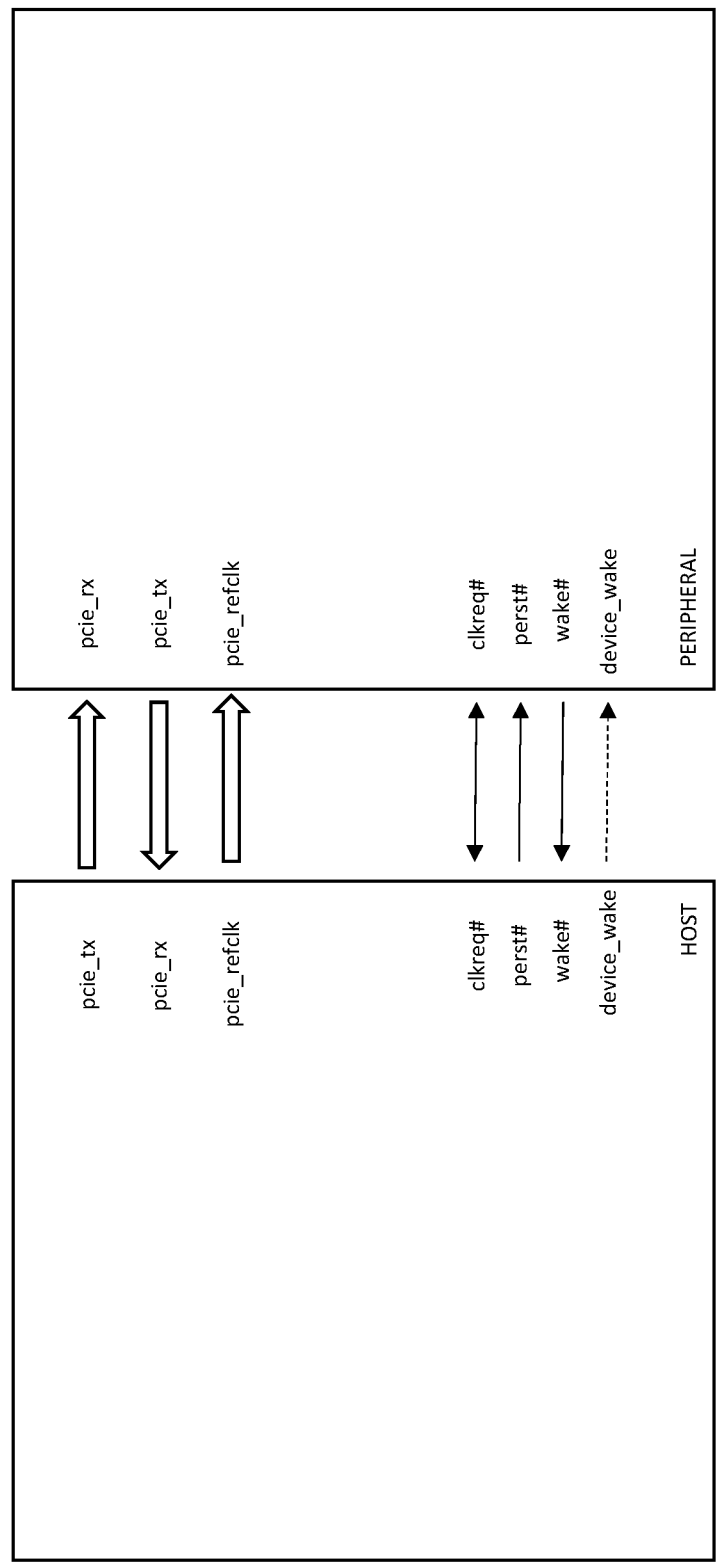
FIG. 2 is a logical block diagram of one exemplary inter-processor communications (IPC) link, useful for explaining various principles described herein.

Now referring to FIG. 2, the physical bus interface 200 includes an IPC link that may be loosely based on the Peripheral Component Interconnect Express (PCIe) standard (e.g., the *PCI Express Base Specification Revision* 4.0 dated Oct. 5, 2017, incorporated herein by reference in its entirety). Those of ordinary skill in the related arts, given the contents of the present disclosure, will readily appreciate that other bus interface standards may be substituted with equal success.

In the exemplary embodiment, the physical bus interface 200 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane is a full-duplex byte stream, transporting data packets in eight-bit 'byte' formats, between the RC and EP of a link, in both directions simultaneously. The physical bus interface 200 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Figure 3:
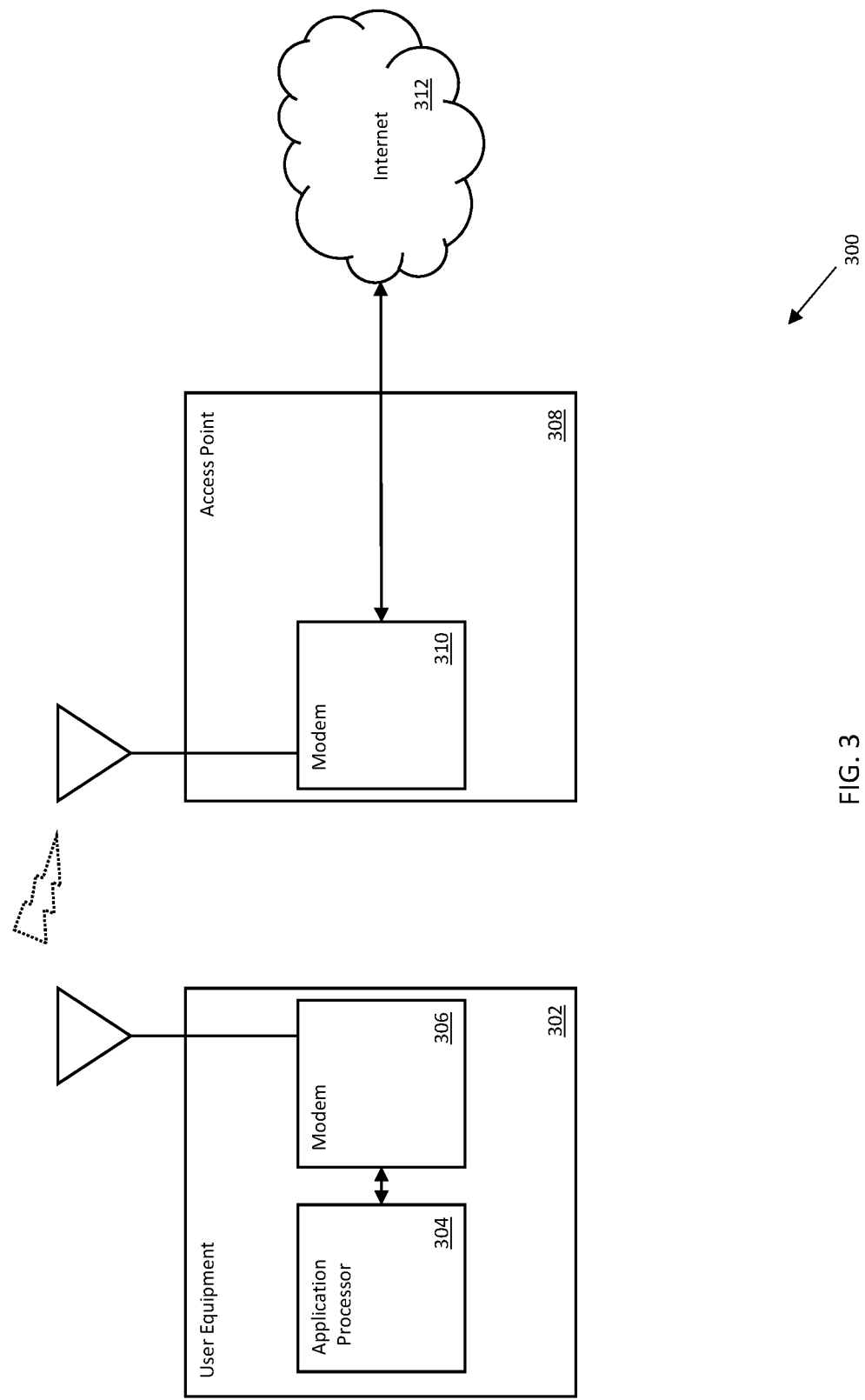
FIG. 3 is a logical block diagram of one exemplary communications network, useful for explaining various principles described herein.

FIG. 3 illustrates a network architecture 300 useful for illustrating various principles described herein. In an embodiment, the architecture 300 includes user equipment 302 that includes a host-side processor (e.g., application processor 304), a peripheral-side processor (e.g., baseband processor 306) and a shared memory module between the application processor 304 and the baseband processor 306. The application processor 304 and baseband processor 306 may include independently operable processors in data communication via an IPC link.

In various embodiments, a user equipment 302 may house the independently operable processors and use the functions thereof. In one embodiment, the user equipment 302 may be a mobile computing device or system for the consumer or end user, such as a smartphone, smartwatch, tablet, or laptop. The user equipment 302 may be configured for wireless connectivity and/or wired connectivity via at least the baseband processor 306. In one variant, the processors include integrated circuits (IC) disposed on a semiconductor die for operation of the user equipment. For example, the baseband processor may include (or be in data communication with) a wireless modem for cellular or Wi-Fi connectivity (or any other means of connectivity, such as Bluetooth, RFID, Global Positioning System (GPS)).

In some embodiments, as shown, the user equipment 302 may be in data communication with other external devices. In one embodiment, the application processor 304 may be connected to an access point 308, by wired or wireless means, via the baseband 310 (via implementations of Wi-Fi, cellular, Bluetooth, NFC, etc.). The access point 308 may in turn enable exchange of data to and from local intranets, the Internet 312, and/or other networks including wireless networks.

In another embodiment, the user equipment may be in data communication with a peripheral device (not shown). Exemplary peripheral devices include, but are not limited to, wireless keyboards, mice, audio equipment (e.g., earbuds, headset, speakers), home and office equipment (e.g., wireless printers), and other user equipment. In some embodiments, the peripheral device may also be in data communication with other networks or devices (e.g., the access point and/or e.g., intranets, the Internet, etc.) to receive and send data.

In the embodiment, the data generated by the application processor 304 may be exchanged via the baseband processor 306 and sent "upstream" to the access point 308, or the data may be transmitted from the access point "downstream" to the application processor 304 via the baseband processor 306. Each of the application processor and the baseband processor may generate its own data for the other processor(s) to process.

Data Pipe Input/Output (I/O)

Figure 4:
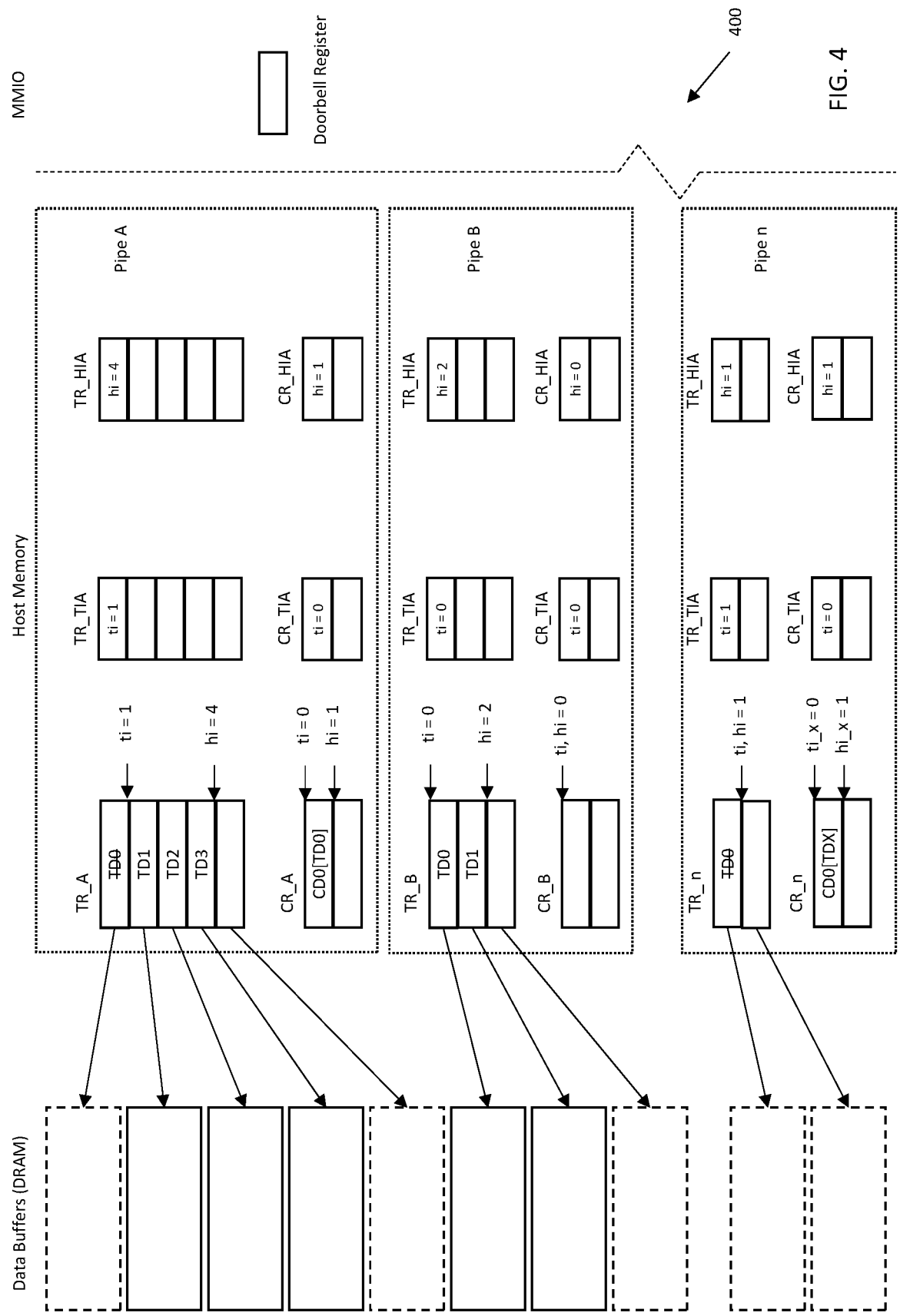
FIG. 4 is a logical block diagram of data structures used during inter-processor communication (IPC) data pipe input/output (I/O) transfers, useful for explaining various principles described herein.

Referring now to FIG. 4, various data structures useful for illustrating one implementation of data pipe I/O operation is depicted. In the illustrated embodiment, the described memory structures reside within a host processor memory; however, artisans of ordinary skill in the related arts given the contents of the present disclosure will recognize that the aspects are not so limited. The various data structures (e.g., index arrays and/or memory buffers) may be located on the host-side and/or peripheral-side memory, respectively. In other variants, some or all of the data structures may be located on a common memory and/or in any other memory accessible by both the host and peripheral processors.

In one such implementation, input and output (I/O) data flows over data pipes in the uplink (UL) and/or downlink (DL) direction. As used herein, the term "uplink" refers to transfers from the host or application processor to the peripheral or baseband processor, and the term "downlink" refers to transfers from the peripheral or baseband processor to the host or application processor. An interface can have any number of uplink pipes and any number of downlink pipes; however, an interface includes at least one pipe. During operation, each software process (e.g., control, data, debug, or other client service) is associated with a single interface.

As shown, multiple distinct "pipes" (Pipe A, Pipe B, . . . Pipe n) transact "data flows" between the application processor and the baseband processor. As a brief aside, transfer descriptor ring (TRs) can be created by "opening" a pipe, and destroyed by "closing" the pipe (e.g., incident to a software process of one processor attempting to communicate to a peer software process of another processor). Common examples of parameters that can be used to open a data pipe, include without limitation e.g., type of pipe, address, number of entries, identification, index vector, header size, footer size, doorbell vector, priority, traffic class, interrupt vector, and or any number of other data structure specific information. For example, a message that opens a TR may include: a buffer size ring address, a buffer size ring entry width, a buffer size ring entry chain, completion type and/or ID, etc.

An IPC link may include at least one pair of unidirectional pipes. In some variants, the IPC link may alternatively or additionally include at least one pair of bidirectional or multidirectional pipes. In various other embodiments, one processor may be in data communication with a plurality of other processor apparatuses via one or more IPC links. For example, in some embodiments, the host may be connected to multiple peripheral processors. In other embodiments, multiple host processors may be connected to a given peripheral processor. More generally, any number of hosts and any number of processors may be connected together according to the aforementioned IPC bus.

Each pipe may be associated with one "transfer descriptor ring" (TR). Each TR is composed of transfer descriptors (TDs). The TR may be described by a TR head index array (TR_HIA) and a TR tail index array (TR_TIA). Each TR_HIA entry indicates the start of the next available TD, and the TR_TIA indicates the next TD to process. Transfers may be from the host to the peripheral, or vice versa. The host writes a head pointer points to the next empty slot in the TR that the host will process, whereas the tail pointer points to the address of the next TD which the peripheral processor will process. The head pointer may be written by the host and read by the peripheral. The tail pointer may be read by the host and written by the peripheral.

Processing a TR may be either a read or a write. For example, in order to perform a write, the host processor allocates buffers for the write that is defined by a TR. The size of the write determines the number and sizes of TDs in the TR. The host writes data to the buffers, and provides the buffers to the peripheral. Thereafter, the peripheral can read from the buffers to effectuate the write. Similarly, in order to perform a read, the host processor allocates buffers for the read; the size of the read is determined by the number and size of TDs in the TR. The maximum size of a read is determined by the size of the buffers indicated in each TD, and the total number of TDs identify the number of read buffers that are queued. The buffers (still empty) are provided to the peripheral and the peripheral fills the buffers.

When the buffers are full, the peripheral notifies the host and the host reads the data stored in the buffers.

As shown in FIG. 4, a host writing to the peripheral creates an "upstream" pipe. When the head pointer of the TR is equal to its tail pointer, the TR is empty. For example, TR_HIA[0] for Pipe A is set to 4; thus, the host can write a new TD at index location 4. Similarly, TR_TIA[0] for Pipe A is set to 1; thus, the peripheral can read and process the TD at index location 1. In another example, a host reading from the peripheral creates a "downstream" pipe. For example, TR_HIA[0] for Pipe B is set to 2; thus, the host can write a new TD at index location 2. Similarly, TR_TIA[0] for Pipe B is set to 0; thus, the peripheral can write to the TD at index location 1.

Each transfer descriptor (TD) references a corresponding backing data buffer. In one embodiment, a single TD may describe a physically contiguous memory buffer, accessible by the host and/or the peripheral processors over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

In various embodiments, the data included in the TD may broadly refer to a payload for delivery to the another processor or another device. A "payload" as used herein broadly refers to a portion of transmitted packetized data that includes an intended message. The payload excludes protocol information used for, e.g., routing the message, error correction, flow control, and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As a brief aside, there are a wide variety of "data types" used in the computing arts. As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, and specialized or specifically designed for a particular function or operation.

So-called "value" data types are data types that signify one or more values to the compiler. Common examples of value data types include, without limitation: Booleans, characters, integer numbers, floating-point numbers, and fixed-point numbers. Another family of commonly used data types are so-called "reference" data types; reference data types are interpreted by logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (e.g., a compiler copies list values at each instance of the list), or treated as a reference (e.g., the complier references a memory location for each instance of the list).

Within the context of the present disclosure, as used herein, the term "pointer" refers to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

As used herein, a "footer" component refers to data associated with, and following, a data structure or a portion thereof (e.g., a transfer descriptor, completion descriptor). As used herein, a "header" component refers to data associated with, and preceding, a data structure or a portion thereof (e.g., a transfer descriptor, completion descriptor). A header or footer may be an optional component of a transfer descriptor or a completion descriptor. Similarly, a header or footer may include data (e.g., a payload) or metadata that describes the descriptor, packet, and/or payload.

The TD/TR data structure enables independent queue processing for both the host and peripheral processors. For example, the peripheral can read from one area of memory described by a first TD while the other host writes to a different area of memory to prepare a different TD. Processing may be performed on a, e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure, for example, as used for the various data transmission schemes over an IPC link as described in U.S. patent application Ser. No. 15/865,638 entitled "METHODS AND APPARATUS FOR REDUCED-LATENCY DATA TRANSMISSION WITH AN INTER-PROCESSOR COMMUNICATION LINK BETWEEN INDEPENDENTLY OPERABLE PROCESSORS" and filed Jan. 9, 2018, incorporated herein by reference in its entirety.

Referring back to FIG. 4, each pipe is further associated with one "completion descriptor ring" (CR). Each CR is composed of completion descriptors (CDs). The CR is described by a CR head index array (CR_HIA) and a CR tail index array (CR_TIA). Each CR_HIA entry indicates the start of the next available CD, and the CR_TIA indicates the next CD to process. Completions are from the peripheral to the host (in response to transfer descriptors). In other words, the CR_HIA is written by the peripheral and points to the next empty slot in the CD that the peripheral may write to, whereas the CR_TIA is written by the host and points to the address of the next CD that the host processor will process. For example, CR_HIA[0] for Pipe A is set to 1; thus, the peripheral will write to the next CD at index location 1. Similarly, CR_TIA[0] for Pipe A is set to 0; thus, the host can process the CD at index location 0.

During operation, the peripheral processor reads the TDs from the TR, and retrieves or writes data referred by or contained therein. However, the peripheral processor may process the TDs/TR according to its own internal considerations (rather than relying on the host processor's task scheduling). Once the peripheral processor has completed processing, it determines completion status, and writes the status to the CDs/CR, thereby providing explicit completion status information to the host processor. The CDs contain completion information that indicate to the host processor (the processor that originated the TDs) that the data has been processed by the peripheral processor and that the memory allocation for the TD/TR can be freed. For example, CD0 of CR_A includes a unique tag that identifies TD0; thus the CD0 provides completion status for TD0. When the host processor processes CD0, the memory allocation for TD0 can be freed and reclaimed for subsequent data transactions.

Completion mechanisms enable multiple processors to coordinate by explicitly acknowledging when data has been e.g., transmitted, rendered, consumed, and/or otherwise processed. Such information can be used to support low-latency transactions, reduce and/or substantially eliminate waiting or confirmation times, and/or improve the speed of operation between independently operable processors. Various other completion mechanisms are described in greater detail in U.S. patent application Ser. No. 16/049,624 entitled "METHODS AND APPARATUS FOR VERIFYING COMPLETION OF GROUPS OF DATA TRANSACTIONS BETWEEN PROCESSORS," filed Jul. 30, 2018, incorporated supra.

Figure 5:
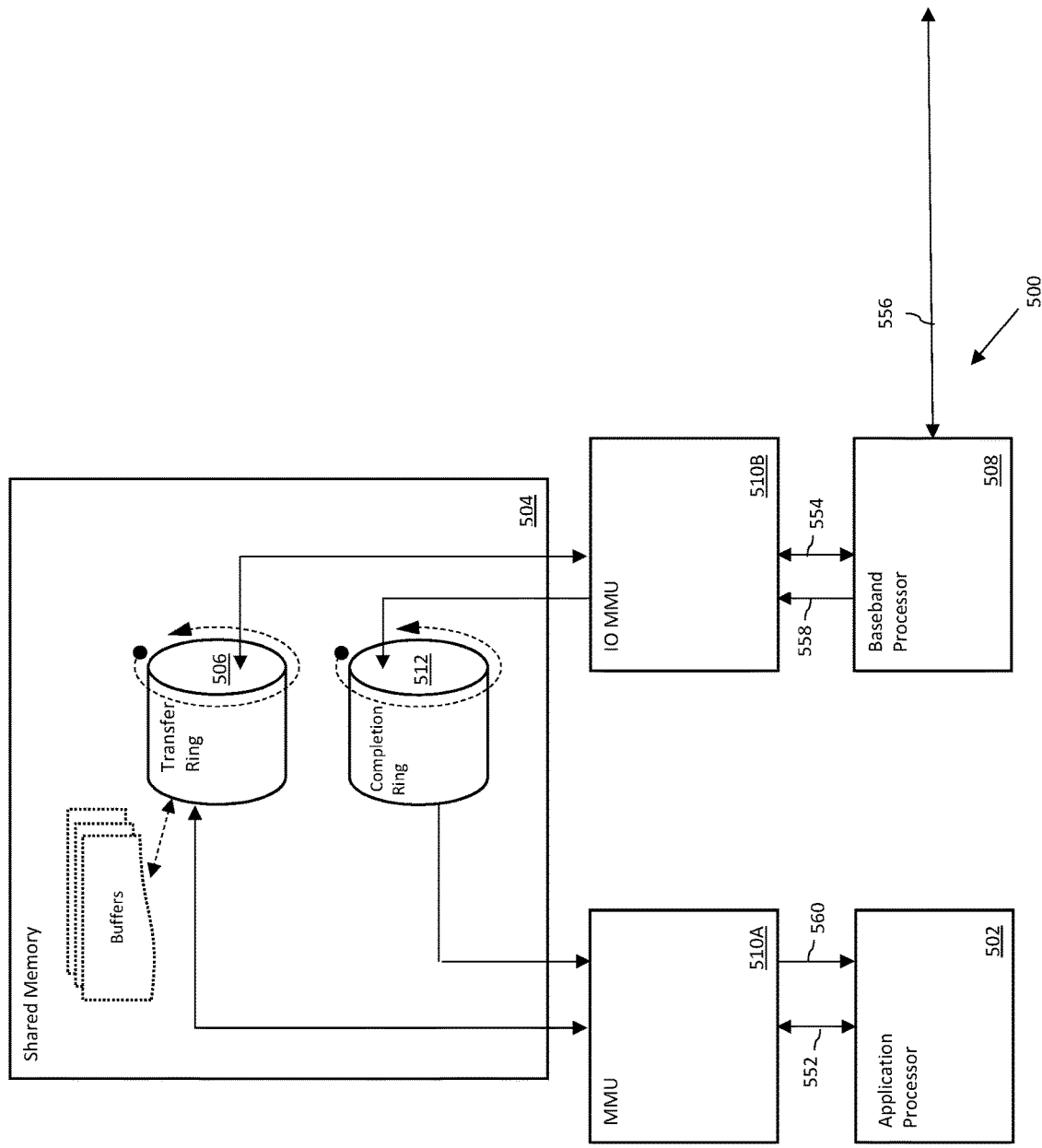
FIG. 5 is a graphical representation of an exemplary inter-processor communication (IPC) data pipe input/output (I/O) transfers, useful for explaining various principles described herein.

FIG. 5 illustrates one exemplary transmission protocol for data transactions between two or more independently operable processor apparatus, via the use of a transfer ring of transfer descriptors (TR/TDs) and a completion ring of completion descriptors (CR/CDs) in a shared memory. While a single TR and CR is illustrated for clarity, the various techniques described herein are generally used with multiple rings operating concurrently.

During operation, a first processor 502 of the independently operable processors (e.g., a host processor or application processor) allocates TDs within a shared memory apparatus 504 and notifies the other second processor 508 (via ringing a doorbell, writing to a pointer array or message signaled interrupt (MSI), etc.).

The data may be stored in or written into backing memory buffers that are represented by one or more TDs. In some variants, the data may be contained in the TDs themselves, and the TDs are delivered to and written to the shared memory 504 via communication link 552 (e.g., an IPC link and corresponding MMU 510A). Specifically, the data may include a payload or information that is to be delivered to the peripheral and/or another device or network entity. In some variants, the data may reside in an external memory, and the one or more TDs may contain data that points to the location in the external memory. The TDs may be placed into a transfer descriptor ring (TR) data structure 506 that resides in the shared memory 504. In one implementation, the first processor 502 may write to a head index that resides in a host-side memory 504, indicating transfer of the TDs.

At a later point in time, the second independently operable processor 508 (e.g., a peripheral processor or baseband processor) reads the TDs on the TR 506 via communication link 554 (e.g., via IO MMU 510B), and reads data from, or writes data into, the backing buffers associated therewith. For example, the second processor 508 reads the TDs and/or dereferences the TDs to the corresponding data or payloads that are pointed to by the TDs. The second processor 508 uses explicit completion descriptors (CD) in a completion descriptor ring (CR) 512 to indicate completion status. More directly, the memory or buffer that is pointed to by the TD/TR cannot be freed by the first processor until the corresponding CD/CR has explicitly identified the completion status.

The second processor 508 may access, write, pad, use, transmit, discard, and/or otherwise consume the data. For example, the second processor 508 may transmit the data via another communication link 556 (e.g., a wireless link, another IPC link) to another device. In one variant, the second processor 508 may transmit the data upstream to another device via a modem resident (or in data communication with) the second processor. The other device may be wireless devices such as wireless earbuds, a wireless computer mouse, mobile user device, and/or other wired or wireless device.

To acknowledge a completion of the data transaction, the second processor 508 may then write one or more CDs to a completion descriptor ring (CR) 512 that resides on the shared memory 504, via communication link 558 (e.g., another IPC link or part of the same IPC link 552 or 554). The first processor 502 may read the CDs on the CR 512 via communication link 560 (e.g., another IPC link or part of the same IPC link 552, 554 or 558) to verify the completed data transaction. The CDs contain information that explicitly indicates to the first processor (i.e., the processor that originated the TDs) that the data has been processed by the second processor 508 and that the memory allocation for the TD/TR can be freed. For example, a given CD may include an identifier of which TD(s) the peripheral retrieved and completed, and/or the address of the buffer accessed to retrieve the data or payload.

Figure 6:
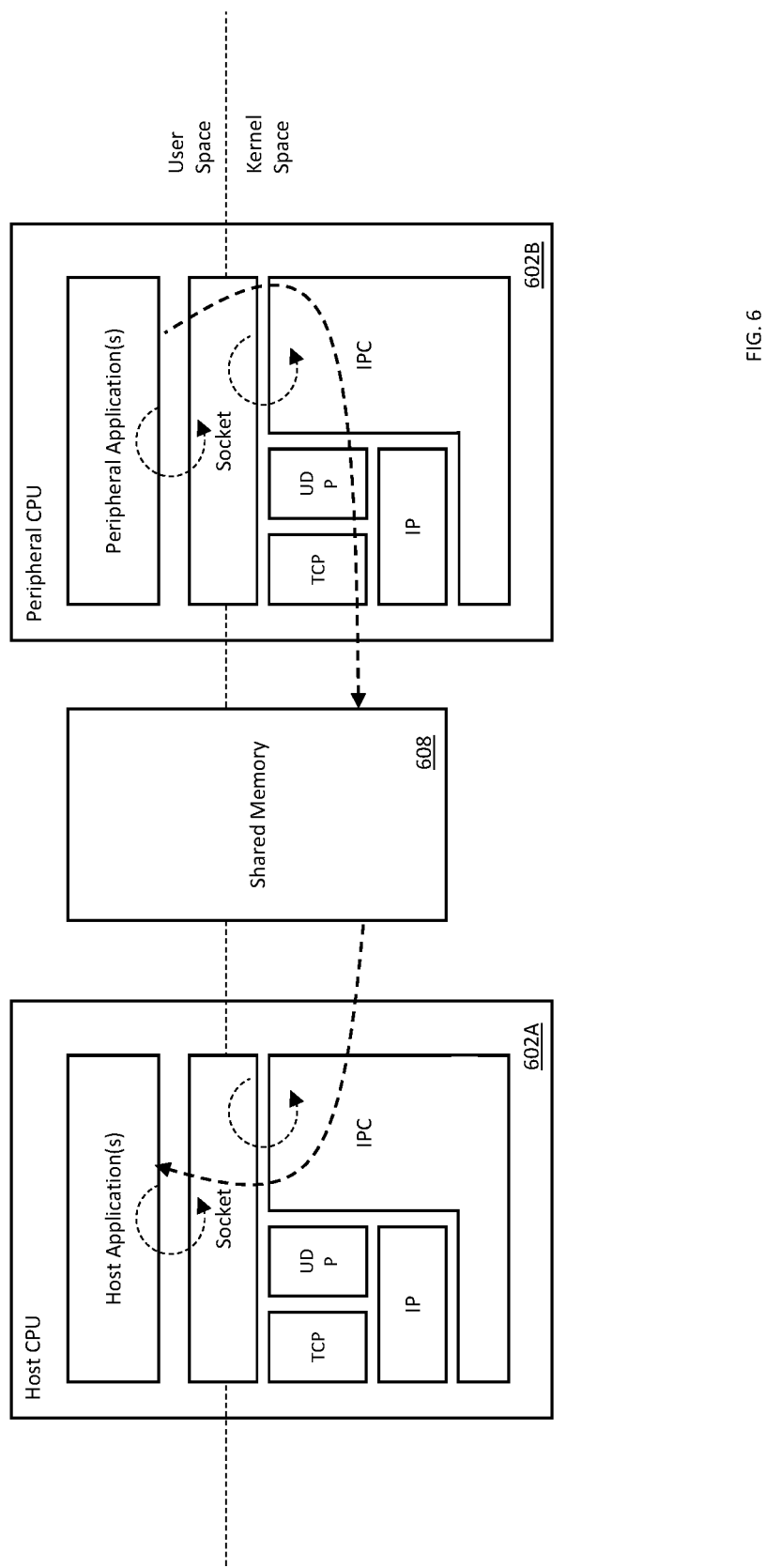
FIG. 6 is a logical block diagram of data transfer via data sockets, useful for explaining various principles described herein.

As previously noted, user space applications read and write to data pipes in the user space, however the data transactions occur within the kernel space. FIG. 6 is a logical representation of socket transactions, useful for explaining context switches incurred during a data transaction. As shown therein, the peripheral processor 602B writes downlink data to a data pipe in user space. The peripheral processor 602B context switches to kernel space to service the socket call; this may entail a subsequent context switch to the IPC driver to write the data into the shared memory 608 via its current TD allocations according to the TD/TR and CD/CR schemes described in FIGS. 4 and 5 discussed supra.

Subsequently thereafter, the host processor 602A independently receives and reads CDs/CR and retrieves the corresponding TDs/TR. The data is provided to the socket via another context switch. Additionally within the kernel, there can be multiple thread switches as well. For example, the kernel may switch from a primary interrupt context to a secondary interrupt contexts. Thereafter, in the secondary interrupt context another thread can be signaled to process the payload. Still other implementations may use greater or fewer layers of context switching.

As should be appreciated within FIG. 6, the foregoing IPC transfer scheme incurs multiple context switches to ensure that each processor can access the shared memory in a non-contentious manner. While each context switch may temporarily halt processing and consume memory resources to save state, context switches can be used to efficiently batch communications together to improve overall system efficiency. For example, one layer can collect an amount of packets for an amount of time prior to triggering the next thread; thus amortizing the cost over a large number of transfers. However, even though the IPC transfer scheme enables independently operable processors to transfer large amounts of data quickly, transferring small amounts of data may be inefficient due to an excessive amount of context switches per unit of data.

The iPhone® (manufactured by the Assignee hereof) commonly includes both native applications as well as 3$^{rd}$ party applications. For a variety of reasons (e.g., security, privacy, etc.), user space software applications are unaware of the underlying transport scheme. Thus, for example, many legacy software applications inherit and continue to implement memory access protections in user space as if they were using memory-mapped input/output (I/O) even though such techniques are not necessary within the IPC framework. Similarly, it should be appreciated that certain applications may only receive marginal benefit from the benefits offered by IPC; for example, very small data transfer sizes may not transfer enough data to defray the costs of IPC overhead. Moreover, since mobile devices have a limited memory capacity and may need to support an arbitrary number of different 3$^{rd}$ party applications, static allocations of dedicated memory for memory-mapped user space applications may be undesirable or infeasible.

To these ends, solutions are needed for dynamically isolating and reaping back a memory space for data transfer in a "pass-through" manner that does not require kernel space intervention.

Example Operation

Figure 7:
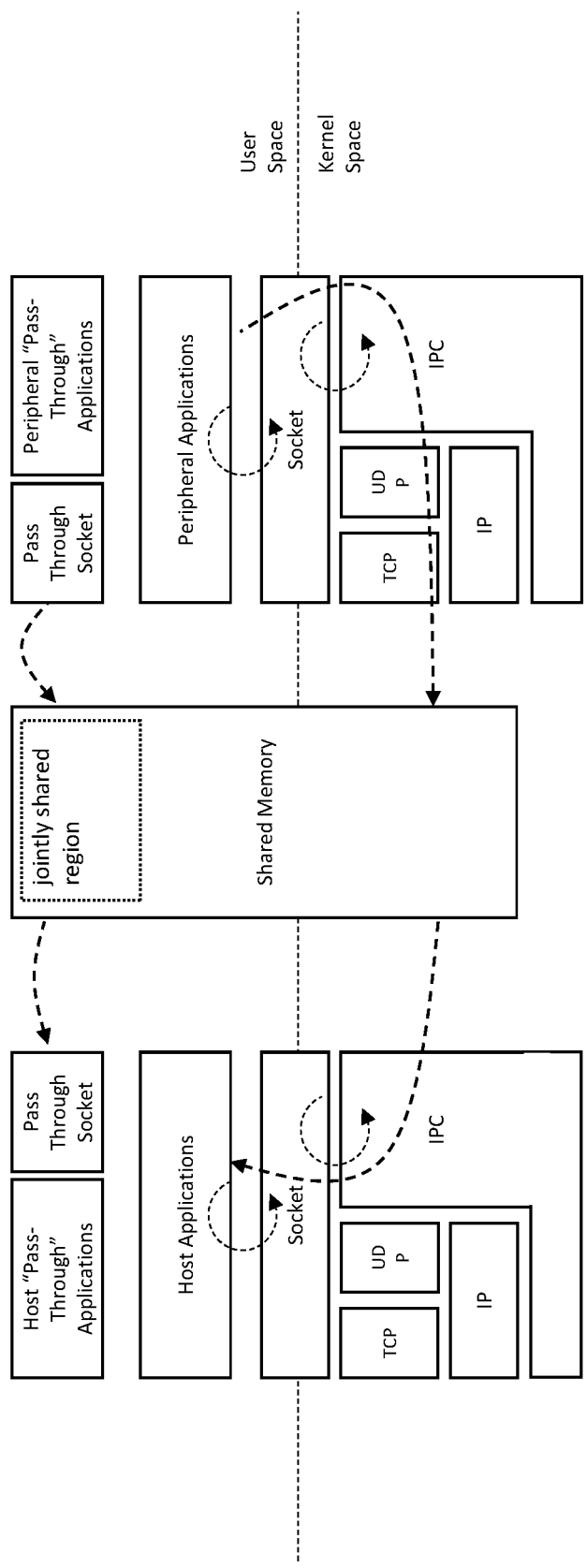
FIG. 7 is a logical block diagram of data transfer via a jointly shared memory, in accordance with the various principles described herein.

FIG. 7 is a logical representation of both pass-through socket transactions and IPC socket transactions, in accordance with the various principles described herein. In one exemplary embodiment, an application can use IPC sockets (as discussed previously), or may directly read and write to jointly shared memory via a memory-mapped access using "pass-through" sockets. More directly, pass-through sockets expose a jointly shared region of host memory to both the peripheral client and the host client in user space. This allows clients to directly interact with the peripheral with memory accesses, without IPC data transfers.

Figure 8:
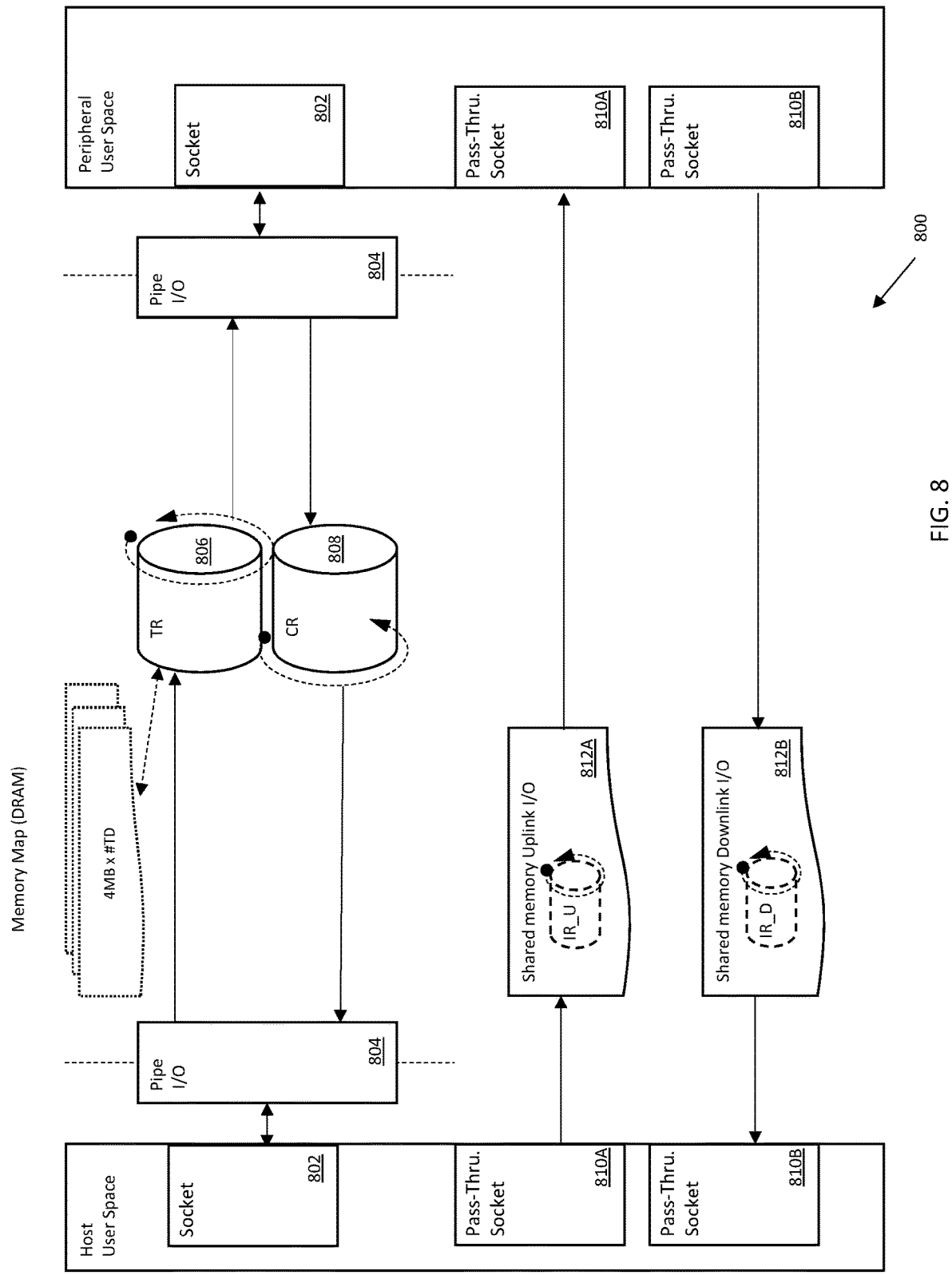
FIG. 8 is a first graphical representation of IPC data pipe I/O transfers and memory-mapped I/O transfers, in accordance with the various principles described herein.

FIG. 8 illustrates one exemplary embodiment of the pass-through transactions to implement streaming audio processing. As shown therein, existing user space applications of the host and peripheral may use sockets 802 to transact data via the kernel space data pipe I/Os 804, transfer rings (TR) 806, and/or completion rings (CR) 808, according to the techniques described supra (see e.g., Data Pipe Input/Output (I/O).) In addition, the pass-through sockets 810 enable user space applications to directly access shared memory 812 without leaving user space. In other words, the pass through sockets 810 can be used to directly read and write to shared memory without context switching to kernel space.

In one exemplary embodiment, a set of pass-through sockets are used to provide streaming audio data transfers. As a brief aside, streaming audio traffic is isochronous (i.e. the data transfer can occur at a fixed rate despite data being queued irregularly). In one such case, the amount of data transferred during each period is of fixed size. As shown therein, a first set of pass-through sockets 810A reserve a first shared memory region 812A for an uplink streaming audio stream, and a second set of pass-through sockets 810B reserve a second shared memory region 812B for a downlink streaming audio stream.

In one exemplary embodiment, streaming uplink and downlink audio is transferred via a circular ring that is managed in user space. More directly, the user space applications for both the host and the peripheral map a shared memory region and use this as a circular Isochronous Ring (IR). There are two IRs shown, with IR_U in the uplink direction and IR_D in the downlink direction. The rings contain a fixed number of slots, and data is generated in each slot periodically. The size of each slot and periodicity of data being generated can be configured according to various application constraints (e.g., the rate of uplink and downlink audio data). In the uplink direction, the client on the host produces the data, which is consumed by the peripheral. In the downlink direction, the peripheral produces the data, which is consumed by the client on the host. There is no exchange of indexes or any interrupt generated for the IR. Instead, both host and peripheral track time independently and periodic intervals are used to implicitly coordinate the data transfer.

As should be appreciated from the foregoing, the user space streaming audio applications control the rate that data is generated and consumed in each of the IR_U and IR_D. As a result, memory space protections that are offered by normal IPC rings are redundant in view of streaming audio user space application constraints. Moreover, by implementing pass-through operation and avoiding unnecessary kernel space data pipe I/Os, the streaming audio application can remove unnecessary context switching which further reduces overall processing overhead and memory swapping.

As previously alluded to, the host and peripheral may have imperfect clock alignment introduced by their independent operation. More directly, the host and processor may have independent power and clocking schemes that vary to some extent. Moreover, legacy streaming audio applications may have been designed for fixed clocking and thus be unaware or unable to correct for imperfect clock alignments. As a result, implementing legacy streaming audio applications using pass-through sockets in independently operable processor systems without correcting for clock drift potentially could result in undesirable loss of audio data and/or introduce other artifacts (chirps, pops, echoes, etc.).

In one exemplary embodiment, the host and peripheral may transact control messages for a jointly shared memory in a non-coordinated manner. For example, within the context of streaming audio, the peripheral can inform the host about IR_U or IR_D buffer wraps via a non-coordinated message. In one such implementation, the peripheral can use a non-coordinated completion descriptor (CD) of type memory event. Similarly, the host can inform the peripheral about I_RU or IR_D buffer wraps via a non-coordinated transfer descriptor (TD) memory notification message.

Using non-coordinated messaging allows the peer entity to appropriately compensate for clock drift. For example, when the peripheral indicates an IR_D buffer wrap to the host, the host can verify that the peripheral's buffer wrap is within sufficient operational ranges to maintain IR_D operation. If correction is needed, then the host processor can either slow down or speed up its consumption of data from IR_D. Similarly, when the peripheral indicates an IR_U buffer wrap to the host, the host can verify that the peripheral's buffer wrap is within sufficient operational ranges to maintain IR_U operation. If correction is needed, then the host processor can either slow down or speed up its writes to IR_U.

Artisans of ordinary skill in the related arts will readily appreciate that the foregoing streaming audio application is purely illustrative. The foregoing techniques may be broadly extended to any application that can benefit from the use and control of a jointly shared memory-mapped region.

Methods

FIG. 9 illustrates a generalized method 900 for using and controlling a jointly shared memory-mapped region between multiple processors.

At step 902 of the method 900, a pass-through application is opened. As used herein, the term "pass-through" refers to an application that does not require the benefits, privileges, or capabilities of kernel space applications to function. Generally, non-kernel applications are initiated within the user space, however the various aspects described hereinafter broadly apply to any applications that can benefit from direct manipulation of memory space.

As previously noted, the term "user space" refers to a portion of system memory that a processor executes user processes from (e.g., processes initiated by and/or having user privileges), whereas "kernel space" is a portion of memory that a processor executes the kernel from. Kernel space is strictly reserved for running privileged operating system (OS) processes, extensions, and most device drivers. Examples of benefits, privileges, or capabilities of kernel space applications include without limitation: memory management (e.g., memory allocation/de-allocation), virtual memory management, power management, network communications, process scheduling, device driver access, file system manipulation, and/or any number of other kernel or operating system functionality.

In one exemplary embodiment, the pass-through application is a user space application that transacts data with a peer user space application. In one exemplary variant, the user space application executes from a first processor and the peer user space application executes from a second processor. In one such case, the first processor is a host processor and the second processor is a peripheral processor. In another such case, the first processor is an application processor and the second processor is a baseband and/or media processor. In still other embodiments, the first processor is internal to a first device and the second processor is external to the first device; for example, the second processor may be located in a remote device such as a cloud or fog network.

Moreover, while the present disclosures are presented within the context of two processors, the various aspects described herein may apply to any number of processors and/or any processor topology. For example, various techniques described herein may be applied with equivalent success to any number of processors organized according to a bus, tree, star, daisy-chain, or any other network topology. Artisans of ordinary skill in the related arts will further appreciate that the various aspects described herein may be modified to suit any number of processors and/or any processor topology.

The various aspects described herein may be used with equivalent success in systems which are not bifurcated into user and kernel space. For example, other systems may be set into multiple tiers of privilege (or no tiers of privilege) and/or implement various transactional barriers between different user space and/or kernel space applications. For example, two user space applications associated with different users (and which normally would be "sandboxed" from one another's memory allocations) may be configured to jointly share a memory space rather than passing through the kernel. Similarly, two kernel space applications for different devices that trust one another may be configured to jointly share a memory space. In still another variant, a user space application may be able to directly write to e.g., an embedded device that does not run any privileged access distinctions. Still other implementations may be substituted with equivalent success by those of ordinary skill, in view of the present disclosure.

In one exemplary embodiment, the application is a media processing application. Common examples of media processing applications include audio and/or visual media processing. In one embodiment, the media processing is a streaming process, in other variants, the media processing is performed from a buffered or otherwise pre-cached memory or data. In still other variants, media may be generated, rendered, modified, and/or created on an as-needed and/or as-created basis.

In other embodiments, the application is a communications processing application. Common examples of communications processing applications include wired and/or wireless data transfer. In one embodiment, the communication processing application is a communication stack that buffers data for transmission and/or reception. Various communication techniques may provide e.g., guaranteed quality-of-service (QoS) and/or best effort delivery.

In one exemplary embodiment, the application is opened. For example, a user may initiate a phone call resulting in the creation of an uplink audio stream for transmitting voice data received from a microphone, and a downlink audio stream for providing voice data to a speaker. Similarly, a user may be called by another user (resulting in the creation of an uplink and downlink media stream on behalf of the user to service the voice call). In still other cases, a daemon process (a background user process) may trigger the creation of an data transfer based on other kernel activity (e.g., a timer expiration, etc.) For example, a daemon process may periodically check with a cellular network to determine whether or not to transmit or receive data. More generally, any creation, instantiation, and/or initialization of an application (media or otherwise) by the user (or on the user's behalf) may be substituted by those of ordinary skill in the related arts given the contents of the present disclosure.

In other embodiments, the application may be re-opened, re-instantiated, re-initialized or otherwise resumed from a quiescent state. As previously noted, a system of independently operable processors may periodically enter a low power state (or other quiescent mode). During such modes, the processors may free active memory to e.g., store the application state in a low power memory and/or non-volatile memory and/or reduce power consumption. Upon wake-up from the low power state, the previously active processes are resumed based on the stored state. Thus, for example, an ongoing media playback may enter and exit low power mode with minimal impact on the user experience.

At step 904 of the method 900, a jointly shared memory space is mapped for the pass-through application. As used herein, the term "jointly shared" refers to a portion of memory that is accessible by applications in a pass-through manner. In one exemplary embodiment, the jointly shared memory is jointly shared by multiple user space applications. In other embodiments, the jointly shared memory is jointly shared by multiple applications; for example, two kernel space applications of different devices can share a jointly shared memory. Various other schemes for jointly sharing a memory space between multiple logical entities will be readily appreciated by those of ordinary skill, given the contents of the present disclosure.

As used herein, the terms "map," "mapping," and "mapped" refer to the assignment of one or more memory locations to a memory-mapped input/output (I/O) address. In one exemplary embodiment, mapping a memory assigns physical address locations within a memory to virtual address locations (the memory-mapped I/O address). The virtual address locations are used by software to read, write, and/or otherwise access specific locations in memory. In one exemplary embodiment, the memory-mapped I/O is further provided to a memory management unit (MMU). In some variants, the MMU is bifurcated into an MMU for the host or application processor and one or more IO MMU for one or more corresponding peripherals. As previously noted, memory maps for the MMU and/or IO MMU can differ (e.g., the host and peripheral may have different virtual address ranges that map to the same physical address space).

In one exemplary embodiment, the memory-mapped I/O is "reserved" from an existing memory allocation. For example, the memory-mapped I/O is reserved from a pool of memory that was previously allocated to IPC transactions. More directly, rather than allocating from a pool of unallocated memory, reserving memory from an existing allocation ensures that the overall memory consumption does not increase. In alternative embodiments, the memory-mapped I/O is allocated from a pool of unallocated memory. More generally, memory-mapped I/O uses a dedicated range of addresses to enable direct access to memory.

In one exemplary embodiment, a memory map message identifies a location within the shared memory for jointly shared memory operation. In one such implementation, the memory map message includes a TD that is sent by the host-side user space application, and interpreted by the kernel space as a request for a jointly shared memory. In another such implementation, the memory map message includes a CD that is sent by the peripheral-side user space application. Common examples of parameters that can be used to open a data pipe, include without limitation e.g., an address (e.g., a TR address), a size (in TDs), a region identifier, priority, traffic class, and/or other host application specific data. For example, an exemplary memory map message may result in the reservation of a number of TDs of a previously created TR to be reserved for jointly shared memory operation. In another such example, an exemplary memory map message may result in the allocation of a new TR having a number of TDs to be allocated from a pool of unallocated memory resources and used as a jointly shared memory.

In some embodiments, the memory map message may identify an actual memory map. In other embodiments, the memory map message may request or propose a memory map; the request for the memory map must be confirmed before it takes effect. In some embodiments, a memory map message may add more memory to a previously mapped jointly shared memory.

While the foregoing discussions describe reservation and/ or allocation of a memory space for jointly shared memory operation, other techniques for isolating a memory space for jointly shared memory operation may be substituted with equivalent success by those of ordinary skill given the contents of the present disclosure.

At step 906 of the method 900, the pass-through application accesses the jointly shared memory space.

In one exemplary embodiment, the pass-through application and peer application transact data via the jointly shared memory. Data transactions can be used to provide e.g., streaming data transfer, media playback, network connectivity, data processing, and/or any number of other data processing transactions. For example, in one such implementation, streaming uplink and downlink audio is transferred via a circular ring that is managed in user space. In one such variant, the applications for both the host and the peripheral map a shared memory region and use this as a circular ring buffer having a fixed number of slots, and data is generated in each slot periodically. The size of each slot and periodicity of data being generated can be configured according to various application constraints (e.g., the rate of uplink and downlink audio data).

In one exemplary embodiment, accesses to the jointly shared memory space are performed without the benefit of kernel space protections. In one embodiment, the pass-through application explicitly manages memory allocations in user space rather than relying on kernel memory management. In one embodiment, the pass-through application coordinates with a peer user space application to ensure that neither user space application are in contention for the jointly shared memory. In another such embodiment, the pass-through application grants access to the jointly shared memory to the peer user space application (thereby ensuring that only one entity is accessing the memory at a time). More directly, explicit management techniques require that control of the jointly shared memory space is only managed by one entity (if at all) at a time.

In some embodiments, management of the jointly shared memory space can be determined as part of the memory map message. In other embodiments, management of the jointly shared memory space can be implied by the user space application usage (e.g., the user space application may be a master that communicates with a slave user space application, etc.) In still other embodiments, management of the jointly shared memory space may be arbitrated for or otherwise determined on a dynamic basis by the user space applications.

In one embodiment, the pass-through application and the peer application impliedly do not contend for access to the jointly shared memory space. Implied contention prevention may be implemented as a function of time, portion, or access type. For example, the pass-through application may only access the jointly shared memory when the peer application is not (and vice versa). In another such case, the pass-through application may only access a portion of the jointly shared memory space that the peer application does not (and vice versa). In still other cases, the pass-through application may only read (or write) a portion of the jointly shared memory space that the peer application only writes (or reads).

While the foregoing discussion is directed to user space memory management, other embodiments may use kernel based memory management, in part or in whole. More directly, while avoiding context switching between user space and kernel space is desirable there may be other considerations that merit kernel space memory management. For example, user space applications of one user with another user space application of a different user may require kernel space management to ensure that the transactions are appropriately privileged. Similarly, user space applications that directly interface with a device driver may need kernel space access.

More generally, artisans of ordinary skill in the related arts will readily appreciate that avoiding context switching between user space and kernel space is but one illustrative benefit of creating jointly shared memory space that can be directly accessed outside of the context of IPC. Various other embodiments may leverage the techniques described within for wholly different purposes (e.g., to maintain legacy software distribution compatibility, access privileges, driver compatibility, increase transaction simplicity and/or speed, etc.)

Various embodiments of the present disclosure may need to change various parameters of the jointly shared memory space during use. More directly, dynamic management of the jointly shared memory usage by the user space application may be one potential benefit of user space operation. Common examples of parameters that may be used to affect memory operation include without limitation: usable size, transaction size, word size, read/write permissions for a portion (or a whole), reserved space, read/write limitations, arbitration policy, quality-of-service (QoS), parity, error correction, and/or any number of other operational parameters.

In one exemplary embodiment, management messages may be transacted as in-band messaging via the IPC link. For example, a host processor may use a transfer descriptor (TD) and/or transfer ring (TR) to communicate with the peripheral, and the peripheral processor may use a completion descriptor (CD) and/or completion ring (CR). As previously noted, jointly shared memory operation may not use a TR/TD and/or CR/CD, thus the in-band IPC messaging may be preserved for semantics but use certain "null" descriptors in order to identify that the transaction is not associated with any existing TR/TD or CR/CD. In other variants, the in-band IPC messaging specifically identify the jointly shared memory region by e.g., a unique identifier. Still other techniques for in-band messaging of jointly shared memory spaces may be substituted with equivalent success, given the contents of the present disclosure.

In some embodiments, the TR/TD and/or CR/CD transactions may be non-coordinated. Within the context of messaging, the term "non-coordinated" refers to messaging with a peer entity that is not responsive to communication, or intended to cause a response. For example, the peripheral processor may send non-coordinated CDs and the host processor may send non-coordinated TDs. For example, a non-coordinated CD is constructed according to the aforementioned IPC formats, but is not "responsive" to a prior TD. Similarly, a non-coordinated TD does not trigger a corresponding CD response.

In other embodiments, the TR/TD and/or CR/CD transactions may be coordinated. Within the context of messaging, the term "coordinated" refers to messaging with a peer entity that is intended to cause a response, or that is responsive to a previous communication. For example, the host processor may send a TD having one or more jointly shared memory parameters; responsively the peripheral processor may acknowledge the parameters via a CD (and thereafter the settings take effect). Moreover, it should be appreciated that coordinated transactions need not necessarily conform to IPC transaction protocols, for example, the peripheral may send a CD to change jointly shared memory operation that results in acknowledgement via a TD from the host. Moreover, in some cases, the parameter change may not be accepted; for example the host may be able to ignore or otherwise negate a change to joint shared memory operation initiated by the peripheral. Still other variants may be substituted by those of ordinary skill, given the contents of the present disclosure.

In some embodiments, management messages may be transacted as out-of-band messaging to the IPC link via e.g., general purpose input/output (GPIO) and/or messaging within the jointly shared memory. For example, in one exemplary embodiment, a user space application and a peer user space application may identify specific locations in memory for controlling jointly shared memory operation. For example, a particular range of memory may be used as a host or peripheral "mailbox" for parameter exchange.

In one exemplary embodiment, changes to jointly shared memory operation asymmetrically controlled by the host and peripheral processor. For example, the host (or the peripheral) may have greater control over how the jointly shared memory is configured, whereas the peer entity may merely accept changes thereto. In other cases, both the host and peripheral have symmetric control over the jointly shared memory. For example, both host and peripheral may have equivalent privileges to control and/or modify the jointly shared memory.

In one exemplary embodiment, the host can transmit a memory notification message to inform the peripheral about a change in a jointly shared memory region. Similarly, in one exemplary embodiment, the peripheral can transmit a memory event message to inform the host about a change to the jointly shared memory region. In one such variant, the host and/or the peripheral can additionally provide a memory update message that specifically identifies the updated parameters for the jointly shared memory region. Variants of the foregoing may additionally include e.g., an identifier for the jointly shared memory, prioritization information, traffic class information, and/or data that is specific to the various user space applications.

At step 908 of the method 900, the pass-through application is closed and the jointly shared memory space is unmapped.

In one exemplary embodiment, the application closes due to termination of user action (e.g., the user hangs up a phone call and/or the caller hangs up the phone). In other embodiments, the application is closed due to other device considerations. For example, in some cases, the application is closed so that the device can place either or both of the host and the peripheral into a low power state. In other cases, the application may be closed so that the kernel can recapture memory for higher priority kernel threads; for example, the user space application for an ongoing audio playback may be considered lower priority than e.g., ensuring that a video data stream remains fluid.

In still other cases, a daemon process (a background user process) may trigger the destruction of a jointly shared memory based on other kernel activity (e.g., a timer expiration, etc.) For example, a daemon process may periodically check with for "runaway" processes and/or other background memory cleanup. More generally, any destruction, reaping, and/or clearing of an application (media or otherwise) by the user (or on the user's behalf) may be substituted by those of ordinary skill in the related arts given the contents of the present disclosure.

As used herein, the terms "unmap," "unmapping," and "unmapped" refer to the de-reservation/de-allocation of the jointly shared memory from the memory-mapped I/O. For example, the memory-mapped I/O may be returned to a pool of memory that is allocated to IPC transactions. In another example, the memory-mapped I/O is returned to a pool of unallocated memory. Common examples of parameters that can be included within the memory unmap message include without limitation e.g., an address (e.g., a TR address), a size (in TDs), a region identifier, and/or other host application specific data. While the foregoing discussions describe "reaping" a jointly shared memory, other techniques for returning a jointly shared memory operation may be substituted with equivalent success by those of ordinary skill given the contents of the present disclosure.

In one such implementation, the memory map message includes a TD sent by the host-side application (or CD sent by the peripheral-side) that is interpreted by the kernel space as a request to unmap jointly shared memory. In one exemplary embodiment, a memory unmap message identifies a jointly shared memory to be unmapped. In other embodiments, a memory unmap message may merely request the unmapping of a jointly shared memory. In yet other embodiments, a memory unmap message may indicate that one user space entity has ended (the jointly shared memory may be used by its peer user space entity without interruption.).

In some embodiments, the memory unmap message may directly cause the jointly shared memory to be unmapped; in other embodiments, the unmap request must be confirmed before it takes effect. In some embodiments, a memory unmap message unmaps the jointly shared memory in whole. In other embodiments, a memory unmap message unmaps the jointly shared memory in part. For example, in some cases, dynamic memory mapping and memory unmapping exchanges can be used to shrink or grow jointly shared memory on an as need basis.

In one exemplary embodiment, an application will flush all pending transactions in its cache and not issue any further access to the jointly shared memory region. In some embodiments, pending transactions will be allowed to complete. Still other embodiments may allow a short time interval to allow any transactions to complete (uncompleted transactions are flushed). In one such variant, responsive to completion of the memory unmap message, the host reaps the jointly shared memory region.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for using a jointly shared memory between a first processor and a second processor, comprising:
    opening a pass-through application in a user space, the pass-through application enabling transmission of data in the user space between the first and second processors without requiring access to kernel space;
    mapping a jointly shared memory space for the pass-through application, the jointly shared memory space comprising a portion of a shared memory which is accessible in the user space;
    enabling access to the jointly shared memory space via the pass-through application, the transmission of data in the user space comprising at least one memory-mapped input/output (I/O) transaction via the jointly shared memory space; and
    closing the pass-through application.

2. The method of claim 1, wherein opening the pass-through application in the user space comprises opening a user space application.

3. The method of claim 2, wherein:
    the accessing of the jointly shared memory space comprises writing data to the jointly shared memory space; and
    the method further comprises:
    causing a peer application to read the written data from the jointly shared memory space.

4. The method of claim 2, wherein:
    the mapping of the jointly shared memory space for the pass-through application comprises assigning a physical address location within a memory device to a virtual address for the at least one memory-mapped input/output (I/O) transaction.

5. The method of claim 2, wherein the user space application can read and write to a physical address location of the jointly shared memory space without context switching to a kernel space communication stack.

6. The method of claim 1, wherein the accessing of the jointly shared memory space comprises queueing a plurality of accesses of the jointly shared memory space.

7. The method of claim 6, further comprising:
    responsive to closing the pass-through application, flushing any outstanding accesses of the plurality of queued accesses.

8. The method of claim 1, wherein the accessing of the jointly shared memory space comprises writing an entry within a ring buffer.

9. The method of claim 1, further comprising:
    changing a parameter of the jointly shared memory space based on a non-coordinated message.

10. An apparatus, comprising:
    a host processor coupled to a peripheral processor; and
    a non-transitory computer readable medium comprising one or more instructions which when executed by the host processor, cause the host processor to:
    manage one or more data pipe transactions via a kernel space communication stack within a shared memory;
    map a jointly shared memory space within the shared memory for a pass-through socket configured to provide access to the jointly shared memory space by the host processor and the peripheral processor without leaving a user space and without requiring access to the kernel space, the jointly shared memory space accessible via a memory-mapped input/output (I/O) in the user space; and
    access the jointly shared memory space via the pass-through socket;
    wherein the pass-through socket is configured to be opened in the user space prior to said mapping of the jointly shared memory space, and closed subsequent to the access of the jointly shared memory space.

11. The apparatus of claim 10, wherein the host processor comprises an application processor and the pass-through application comprises a streaming audio application.

12. The apparatus of claim 10, wherein the one or more data pipe transactions are managed via a transfer ring (TR) of an inter-processor communication (IPC) driver.

13. The apparatus of claim 12, wherein the jointly shared memory space within the shared memory is reserved from a memory space associated with the IPC driver.

14. The apparatus of claim 12, wherein the jointly shared memory space within the shared memory is allocated from unallocated memory.

15. An apparatus, comprising:
a peripheral processor coupled to a host processor; and
a non-transitory computer readable medium comprising one or more instructions which when executed by the peripheral processor, cause the peripheral processor to:
open a pass-through application in a user space so as to allow receipt of a memory map message identifying a jointly shared memory space within a shared memory, the jointly shared memory space being configured to enable exchange of data between the peripheral processor and the host processor within the user space without incurring a context switch to a kernel space;
access the jointly shared memory space via the pass-through application initiated in the user space;
transmit a non-coordinated control message to the host processor to signal an event associated with the jointly shared memory space; and
close the pass-through application.

16. The apparatus of claim 15, wherein the peripheral processor comprises a media processor and the pass-through application comprises a streaming audio application that uses a memory-mapped input/output (I/O) to access the jointly shared memory space.

17. The apparatus of claim 15, wherein the non-coordinated control message comprises a completion descriptor (CD) that does not correspond to a transfer descriptor (TD).

18. The apparatus of claim 15, wherein the jointly shared memory space comprises a circular buffer within user space.

19. The apparatus of claim 18, wherein the non-coordinated control message is transmitted via a kernel space communication stack.

20. The apparatus of claim 19, wherein the event associated with the jointly shared memory space comprises a wrap of the circular buffer.

* * * * *